(12) United States Patent
Guim Bernat et al.

(10) Patent No.: US 10,686,688 B2
(45) Date of Patent: Jun. 16, 2020

(54) METHODS AND APPARATUS TO REDUCE STATIC AND DYNAMIC FRAGMENTATION IMPACT ON SOFTWARE-DEFINED INFRASTRUCTURE ARCHITECTURES

(71) Applicant: INTEL CORPORATION, Santa Clara, CA (US)

(72) Inventors: Francesc Guim Bernat, Barcelona (ES); Susanne M. Balle, Hudson, NH (US); Daniel Rivas Barragan, Cologne (DE); John Chun Kwok Leung, Folsom, CA (US); Suraj Prabhakaran, Aachen (DE); Murugasamy K. Nachimuthu, Beaverton, OR (US); Slawomir Putyrski, Gdynia (PL)

(73) Assignee: INTEL CORPORATION, Santa Clara, CA (US)

(*) Notice: Subject to any disclaimer, the term of this patent is extended or adjusted under 35 U.S.C. 154(b) by 116 days.

(21) Appl. No.: 15/655,846

(22) Filed: Jul. 20, 2017

(65) Prior Publication Data
US 2018/0026868 A1 Jan. 25, 2018

Related U.S. Application Data

(60) Provisional application No. 62/427,268, filed on Nov. 29, 2016, provisional application No. 62/423,727, (Continued)

(51) Int. Cl.
*H04L 12/26* (2006.01)
*G06F 16/22* (2019.01)
(Continued)

(52) U.S. Cl.
CPC .......... *H04L 43/16* (2013.01); *G06F 16/2282* (2019.01); *G06F 16/2379* (2019.01); (Continued)

(58) Field of Classification Search
CPC ... H04L 43/0876; H04L 47/803; H04L 67/10; H04L 67/1031; H04L 67/34;
(Continued)

(56) References Cited

U.S. PATENT DOCUMENTS 8,179,809 B1 * 5/2012 Eppstein .............. G06F 9/5061
370/252
8,769,238 B1 7/2014 Sivasubramanian et al.
(Continued)

OTHER PUBLICATIONS

International Search Report received for PCT Patent Application No. PCT/US2017/058809, dated Feb. 6, 2018, 5 pages.

*Primary Examiner* — Phong La

(57) ABSTRACT

Techniques for reducing fragmentation in software-defined infrastructures are described. A compute node, including one or more processor circuits, may be configured to access one or more remote resources via a fabric, the compute node may be configured to receive a dynamic tolerated fragmentation for the one or more remote resources. The compute node may be configured to monitor the performance of the one or more remote resources. For example, the compute node may be configured to monitor if one or more of the monitored resources were to exceed a threshold bandwidth or latency range as defined by the dynamic tolerated fragmentation. The compute node may be configured to determine that the monitored performance of the one or more remote resources is outside a threshold defined by the dynamic tolerated fragmentation. If one or more of the remote resources is outside the threshold, for a predetermined period of time, or otherwise, the compute node may be configured to determine so and take appropriate measures, such as generating a message indicating that performance of the one or more remote resources is outside a threshold defined by the dynamic tolerated fragmentation. Other embodiments are described and claimed.

19 Claims, 21 Drawing Sheets

Related U.S. Application Data filed on Nov. 17, 2016, provisional application No. 62/376,859, filed on Aug. 18, 2016, provisional application No. 62/365,969, filed on Jul. 22, 2016.

(51) Int. Cl.
| | | |
|---|---|---|
| *G06F 16/23* | (2019.01) | |
| *H04L 12/24* | (2006.01) | |
| *H04L 12/927* | (2013.01) | |
| *H04Q 9/00* | (2006.01) | |
| *H04L 29/08* | (2006.01) | |
| *H04L 12/925* | (2013.01) | |

(52) U.S. Cl.
CPC ...... *H04L 41/0816* (2013.01); *H04L 41/0896* (2013.01); *H04L 41/12* (2013.01); *H04L 41/5025* (2013.01); *H04L 43/0876* (2013.01); *H04L 47/803* (2013.01); *H04L 67/10* (2013.01); *H04L 67/1031* (2013.01); *H04L 67/34* (2013.01); *H04Q 9/00* (2013.01); *H04L 41/16* (2013.01); *H04L 41/5009* (2013.01); *H04L 41/5054* (2013.01); *H04L 43/0858* (2013.01); *H04L 43/0894* (2013.01); *H04L 47/722* (2013.01); *H04L 47/805* (2013.01); *H04Q 2209/20* (2013.01)

(58) Field of Classification Search
CPC . H04L 41/0816; H04L 41/0896; H04L 41/12; H04L 41/5025; H04L 43/16; G06F 16/2379; G06F 16/2282
USPC .......................................................... 370/252
See application file for complete search history.

(56) References Cited

U.S. PATENT DOCUMENTS

| | | | |
|---|---|---|---|
| 2005/0134307 A1* | 6/2005 | Stojanovic | H04L 25/028 326/31 |
| 2006/0140115 A1 | 6/2006 | Timus et al. | |
| 2008/0062890 A1 | 3/2008 | Temple | |
| 2011/0029981 A1* | 2/2011 | Jaisinghani | H04L 41/12 718/104 |
| 2012/0166624 A1 | 6/2012 | Suit | |
| 2012/0303584 A1 | 11/2012 | Baffier et al. | |
| 2013/0298123 A1* | 11/2013 | Zuo | H04L 47/20 718/1 |
| 2013/0318341 A1* | 11/2013 | Bagepalli | H04L 63/166 713/151 |
| 2015/0036480 A1* | 2/2015 | Huang | H04L 41/0663 370/220 |
| 2015/0263927 A1* | 9/2015 | Baumback | G06F 9/5027 709/224 |
| 2015/0350023 A1* | 12/2015 | Srinivas | H04Q 3/0083 370/218 |
| 2016/0016083 A1* | 1/2016 | Davis | A63F 13/12 463/5 |
| 2016/0294621 A1* | 10/2016 | Werth | G06F 9/5072 |
| 2016/0337193 A1* | 11/2016 | Rao | H04L 49/25 |
| 2017/0019917 A1* | 1/2017 | Ma | H04W 4/70 |
| 2017/0289002 A1* | 10/2017 | Ganguli | H04L 43/0876 |
| 2017/0359217 A1* | 12/2017 | Ahuja | H04L 67/1031 |
| 2018/0024867 A1* | 1/2018 | Gilsdorf | G06F 3/0613 709/226 |
| 2018/0152201 A1* | 5/2018 | Gopal | H04L 41/0816 |
| 2018/0254910 A1* | 9/2018 | Dutz | H04L 9/3271 |
| 2018/0287902 A1* | 10/2018 | Chitalia | H04L 43/045 |
| 2018/0295206 A1* | 10/2018 | Devaraju | H04L 67/2847 |
| 2019/0007341 A1* | 1/2019 | Clarke | G06F 15/173 |

\* cited by examiner

*Data Center*
*1100*

*1600*

*1800*

METHODS AND APPARATUS TO REDUCE STATIC AND DYNAMIC FRAGMENTATION IMPACT ON SOFTWARE-DEFINED INFRASTRUCTURE ARCHITECTURES

RELATED APPLICATIONS

This application claims priority to U.S. Provisional Patent Application No. 62/427,268, filed Nov. 29, 2016; U.S. Provisional Patent Application No. 62/423,727, filed Nov. 17, 2016; U.S. Provisional Patent Application No. 62/376,859, filed Aug. 18, 2016; and U.S. Provisional Patent Application No. 62/365,969, filed Jul. 22, 2016; each of which is hereby incorporated by reference in its entirety.

BACKGROUND

Applications executed in a data center may use a set of resources in order to achieve a certain goal (e.g., process database queries performed by users). Applications may be sensitive to a subset of resources from all the resources available within a particular data center. For example a database within the data center may use processors, memory, disk, and fabric, but may be most sensitive to processor and memory availability and performance. Data center throughput may be increased by adding resources, such as memory and compute bandwidth and power. However, increasing other resources, such as fabric or disk may not provide a direct benefit to throughput. Furthermore, reduction of memory or compute bandwidth may have negative impact on throughput. Data center architectures have addressed the problem of mapping the correct amount of resources to the applications using applications requirements, which may be provided by the user or directly by the application, in order to do the proper resource selection and allocation. This process may include selecting the set of resources and also ensuring that certainty quantities and qualities such as the needed Quality of Service (QoS) are reserved to satisfy the requirements. However, in many data center architectures, such as those using software defined infrastructure, there are remaining challenges with respect to the correct allocation and management of resources. Accordingly, improved techniques for the management of resources within data center architectures are desirable.

DETAILED DESCRIPTION

Figure 1:
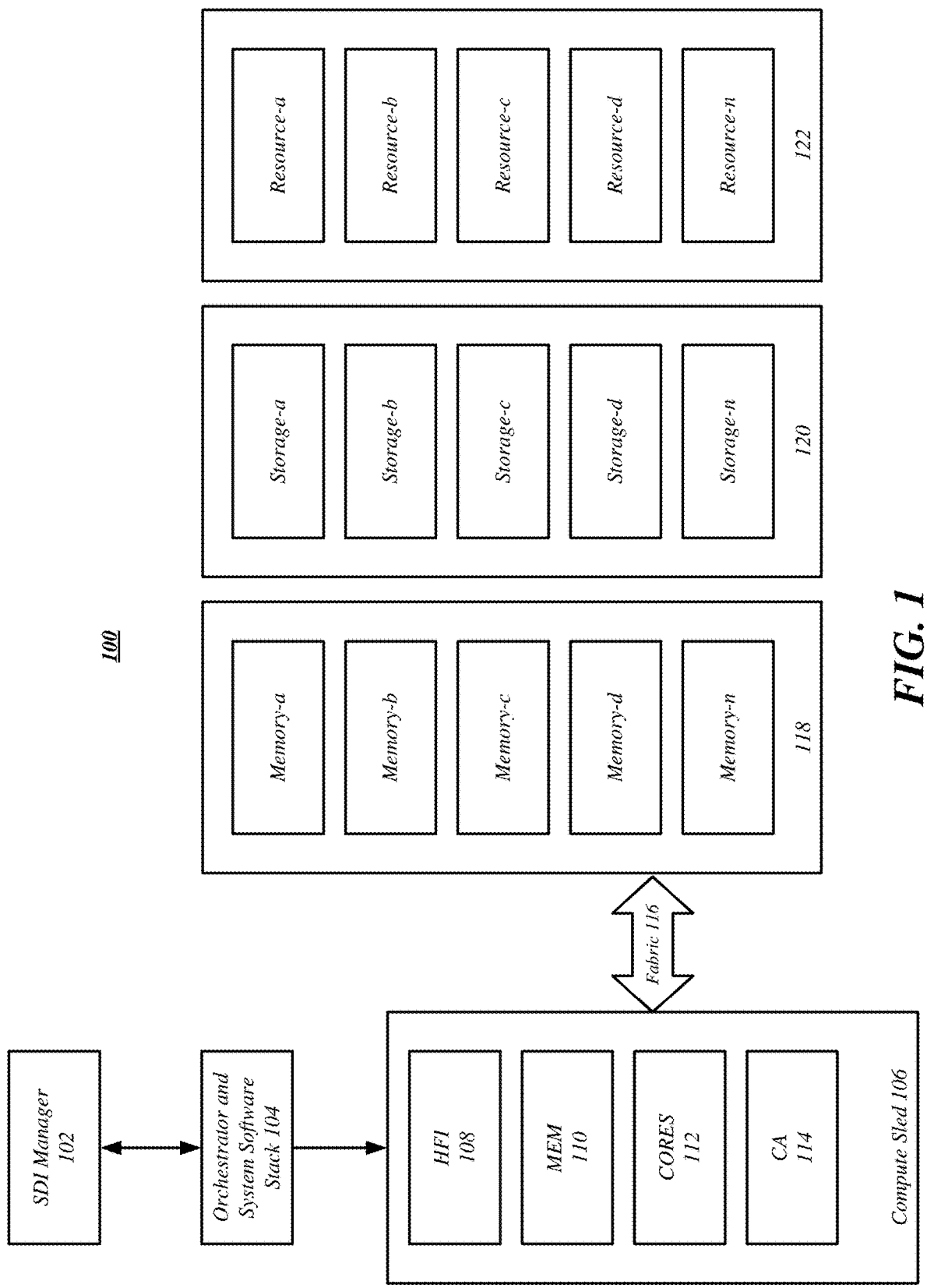
FIG. 1 illustrates a block diagram of a system according to an embodiment.

Various embodiments are generally directed to techniques for management of software defined infrastructure (SDI) systems. In particular, some embodiments are directed to the use of static or dynamic partitions, which may be user-defined or determined based upon machine learning techniques to satisfy the needs of applications known to run on a data center.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general computing device. The required structure for a variety of these machines will appear from the description given.

The devices described herein may be any of a variety of types of computing devices, including without limitation, a server, a workstation, a data center, a laptop computer, an Ultrabook® computer, a tablet computer, a smart phone, or the like.

In various embodiments, the aforementioned processors may include any of a wide variety of commercially available processors, including without limitation, an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked. Furthermore, in various embodiments any number of the processor elements 110, 210, and/or 410 may include support for a trusted execution environment (e.g., Intel CSE®, Intel ME®, Intel VT®, Intel SGX®, ARM TrustedZone®, or the like) to provide for the processing and/or storing of sensitive information.

In various embodiments, the aforementioned storages may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, networks may be a single network possibly limited to extending within a single building or other relatively limited area, a combination of connected networks possibly extending a considerable distance, and/or may include the Internet. Thus, networks may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Accordingly, the aforementioned interfaces may include circuitry providing at least some of the requisite functionality to enable such coupling. However, the aforementioned interfaces may also be at least partially implemented with sequences of instructions executed by the processor elements (e.g., to implement a protocol stack or other features). Where one or more portions of the networks may employ electrically and/or optically conductive cabling, the interface may employ signaling and/or protocols conforming to any of a variety of industry standards, including without limitation, RS-232C, RS-422, USB, Ethernet (IEEE-802.3) or IEEE-1394. Alternatively or additionally, where one or more portions of the networks entail the use of wireless signal transmission, corresponding ones of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although the interface is depicted as a single block, it might include multiple interfaces that may be based on differing signaling technologies. This may be the case especially where one or more of these interfaces couples the components to more than one network, each employing differing communications technologies.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation. Furthermore, as used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrase "at least one of A, B or C" can mean A; B; C; A and B; A and C; B and C; or A, B and C.

FIG. 1 illustrates a block diagram of a system according to an embodiment. System 100 may be a SDI architecture, in which resources may be defined by applications, and composite nodes may be created from a set of available resources on an application-by-application basis. In some data centers, the resource selection and allocation for the application may be done by a resource manager, which may be operated separately from, or within, an orchestrator. Traditional architectures may be composed by a set of static platforms or nodes Ns={N1, . . . , Nm} that the resource manager may allocate to the application based upon characteristics, properties, and/or requirements. Each node may include a set of resources with a certain characteristics (i.e., performance, capacity, etc.). The data center may be composed at the same time by different nodes with different types of resources, for example.

Forthcoming data center architectures may be based on SDI, such as the architecture illustrated in FIG. 1. In SDI architectures, applications may be executed on top of a composite node, which may be dynamically created by the SDI manager 102 (i.e., a Rack Scale Design Pod Manager, in some exemplary embodiments), or created based upon user or application instructions in some embodiments. These composite nodes, which may be composed by different resources that are disaggregated from the platform and distributed in different parts of the data center, may be virtualized to the application and are shown as an isolated and "local" resource.

In general terms, SDI architectures may expose a set of pools of resources, such as memory pool 118, storage pool 120, and resource pool 122, each comprising one or more nodes of a given resource, to the orchestrator 104 and system software stack 104. Orchestrator 104, based on user requests or application requests, may request to SDI manager 102 to compose a composite node based on those requirements. The composed node may be defined by SDI manager 102, as described in detail herein, and returned to orchestrator 104. Once a composed node is defined by SDI manager 102 and received by orchestrator 104, an application may be booted and deployed on the composed node, which may include a compute sled 106 and one or more resources from memory pool 118, storage pool 120, and resource pool 122, connected via fabric 116. While three exemplary pools are illustrated, it can be appreciated that more or fewer pools may be used in various embodiments. Further, resource pool 122 may include one or more data center resources, such as field-programmable gate arrays (FPGAs), for example. Compute sled 106 may include one or more components, such as Host Fabric Interconnect/Interface (HFI) node 108, MEM memory node 110, CORES processing node 112, and caching agent (CA) node 114, which may each be consistent with one or more of the embodiments described herein.

In an embodiment, CA node(s) 114 may be the coherency agents within a node that process memory requests from the cores within the same node, and ensure data is maintained in a coherent manner within a domain. Home Agents (HA) may be the node clusters that are responsible for processing memory requests from the CAs and may act as a home for part of the memory address space (one die may have multiple homes having a distributed address space mapping). Depending on the address space from which data is requested, the request may be fulfilled from an address space of the node's local memory, the Unified Path Interconnect (UPI) agent (formerly called QPI or KTI) may route the request to an address space of another processor within the same coherent domain, or the request may be fulfilled from an address space associated with a processor through the Host Fabric Interface (HFI) that is outside the coherent domain. All the processors connected through UPI may belong to the same coherent domain. One system may be composed by one or more coherent domains being all the coherent domains connected through fabric interconnect. For example high-performance computing systems (HPC) or data centers may be composed by N clusters or servers that can communicate with each other using fabric 116. Using the fabric 116, each coherent domain may expose some address regions to the other coherent domains. In some embodiments, a fabric interconnect allows mapping addresses of memory ranges between different coherent domains.

Figure 2:
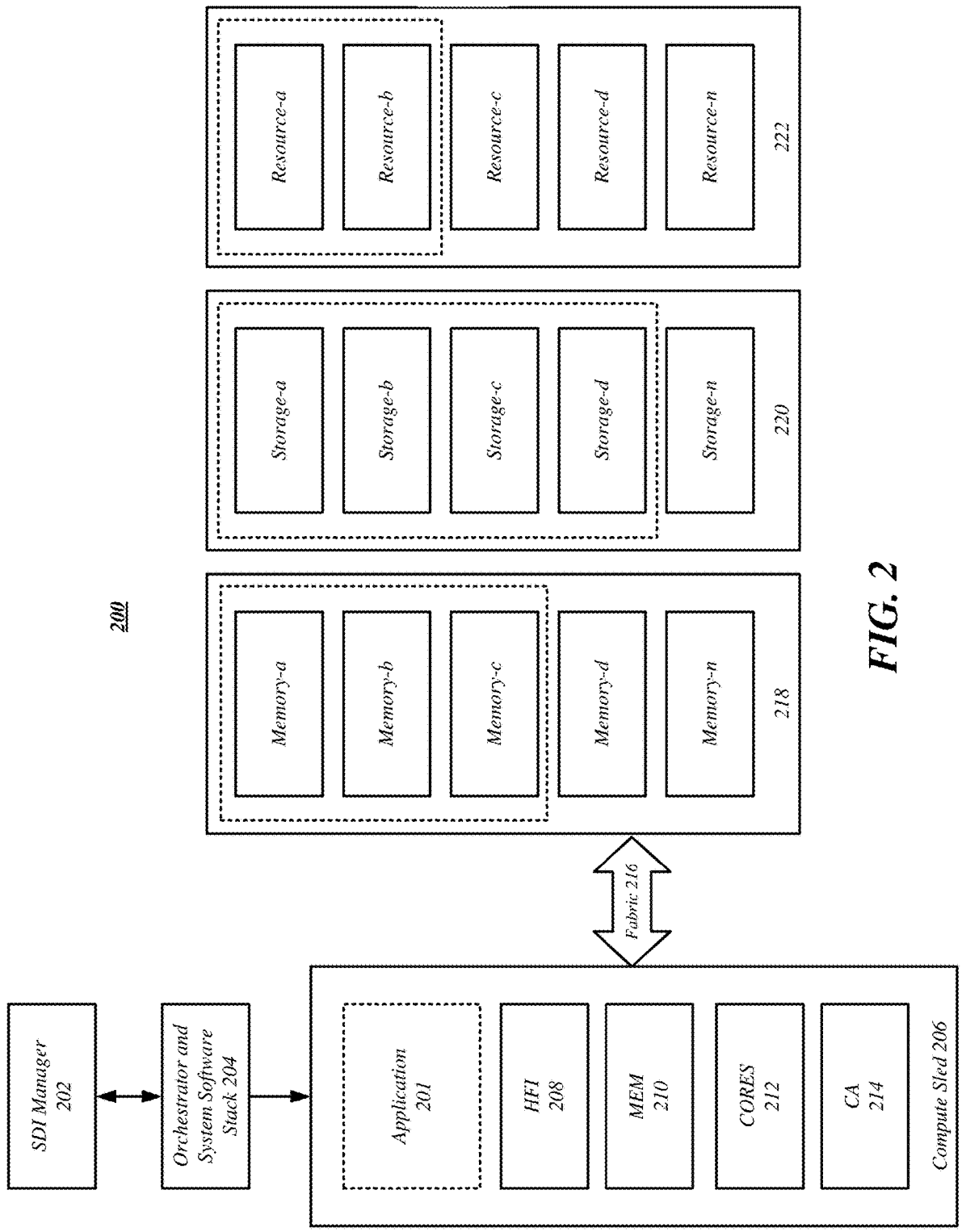
FIG. 2 illustrates a block diagram of a system according to an embodiment.

FIG. 2 illustrates a block diagram of a system according to an embodiment. As illustrated within FIG. 2, an SDI system 200 (with like-numbered elements with respect to FIG. 1) may include an application 201 running on compute sled 206. As illustrated, application 201 is running on a composed node, which may be defined by SDI manager 202 to include compute sled 206, three memory nodes from memory pool 218, four storage nodes from storage pool 220, and two resource nodes from resource pool 222. Once the composite node is created, an OS may be booted in the node and the application may begin execution using the aggregated resources as if they were physically in the same node.

In SDI architectures, resources, such as 218, 220, and 222, may be distributed across the data center and, thus, resources of the same type (exposed as local resource of a composite node) may show non-uniform access. This non-uniformity may be referred to as resource fragmentation: resources that should provide a certain performance (i.e., latency and bandwidth) may provide lower performance due their location in the data center. Fragmentation may appear as a heterogeneity effect, as illustrated and described below, or as a distance effect (e.g., compute sleds are far from the selected resources). Techniques described herein may use a set of extensions to the SDI architecture to reduce impact of fragmentation to applications. Techniques described herein may address at least two types of fragmentation: dynamic (e.g., due to SDI fabric load or resource utilization) and static (e.g., physical location of the resource with respect to compute sleds). Static fragmentation may be caused by disparate locations for resources. Having resources allocated spread across the system instead of together in a few nodes may lead to an increase of latency, impacting performance Dynamic fragmentation may be influenced by where resources were allocated and caused by the status of the system or, at a finer grain, the node (or any physical entity where resources are shared), i.e., it is caused by load of a particular shared resource. Dynamic fragmentation may be influenced by the allocation because the closer resources for a given node are allocated, the less impact will have the sharing on their performance.

Techniques described herein address fragmentation to allow an application and/or the underlying software stack to specify performance requirements for a certain type of resource to the SDI manager so that spare resources in the data center may be used to meet those performance requirements. In addition, techniques described herein introduce a QoS concept, the tolerated dynamic fragmentation, which relates to how static fragmentation changes over time and how the architecture dynamically defines composite nodes to satisfy these requirements. SDI architecture may achieve certain degree of QoS by creating composite nodes and associating disaggregated resources in isolation (from the point of view of the application). However, some existing SDI architectures share resources that facilitate the access to these disaggregated resources. For example, accessing a disaggregated memory implies that fabric is shared between multiple compute sleds, the HFI connecting the memory server may also be shared. It is also possible that a resource (i.e, memory) that is shown as one component of the composite node is actually composed of multiple resources provided by multiple pools (i.e, the SDI architecture has four memory servers hosted in separate racks or drawers of the same rack).

As fragmentation is described above, resources may be allocated initially without consideration for IP SLAs, but instead with respect to static fragmentation. Dynamic fragmentation is monitored in case IP SLAs need to be established and QoS may be enforced. Some techniques described herein may aim to maintain good performance while improving resource utilization or, in a different way, improve resource utilization without impacting performance.

Figure 3:
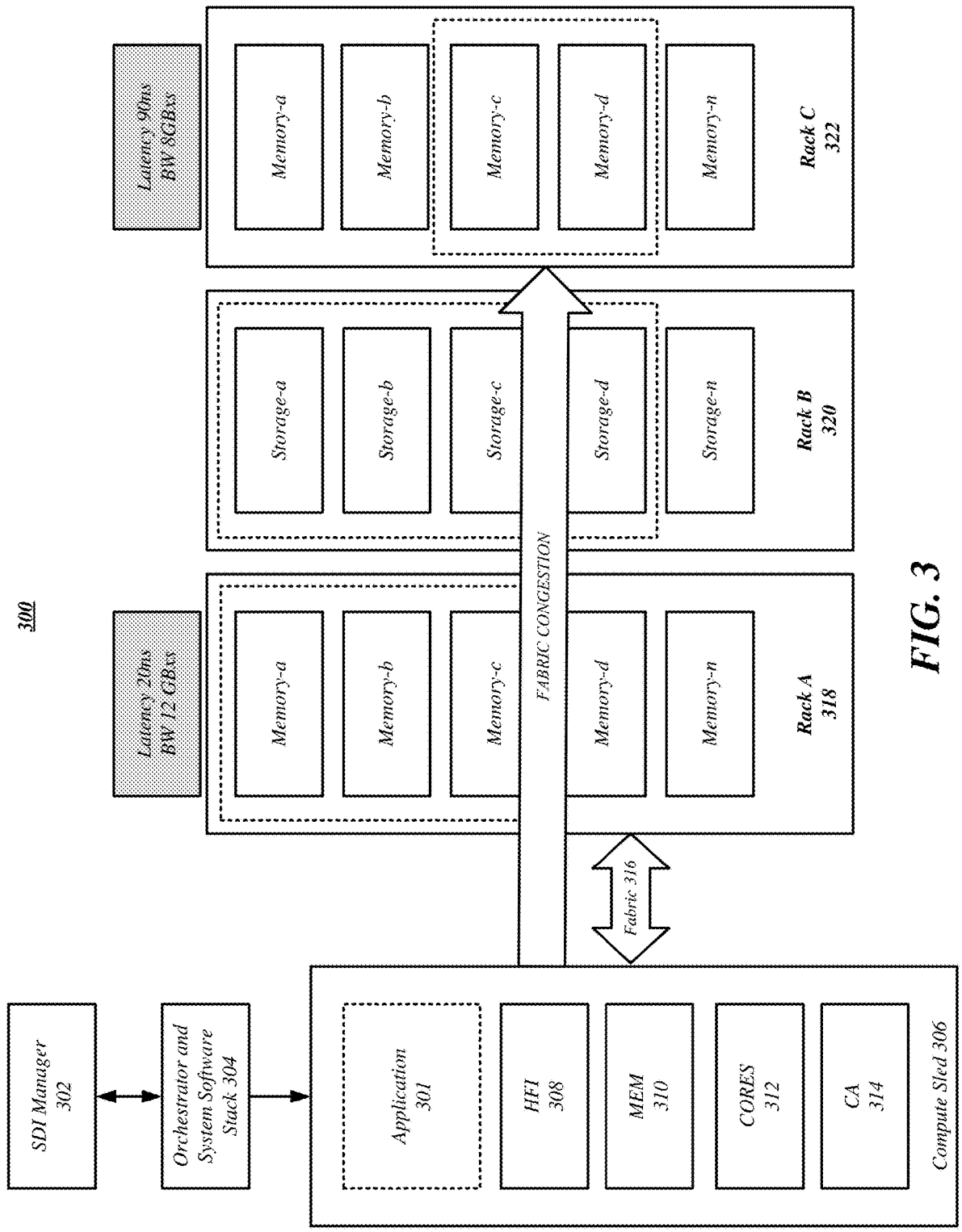
FIG. 3 illustrates a block diagram of a system according to an embodiment.

FIG. 3 illustrates a block diagram of a system 300 according to an embodiment. System 300 may include similar elements and like-numbering to FIG. 2, described above. In addition to the elements of FIG. 2, system 300 illustrates latency for two memory racks, 318 and 322. As shown, the latency and bandwidth of rack 318 is, as an example, 20 ns and 12 GB/sec, respectively. In another example, the latency and bandwidth of rack 322 is 90 ns and 8 GB/sec, respectively. As shown, an application 301 may be running on a composite node which is utilizing resources from both rack 318 and rack 322. In this example, application performance may be negatively impacted due to the difference in latency and bandwidth between racks 318 and 322. The slowdown in performance may cause fabric congestion across the node during application runtime.

Figure 4:
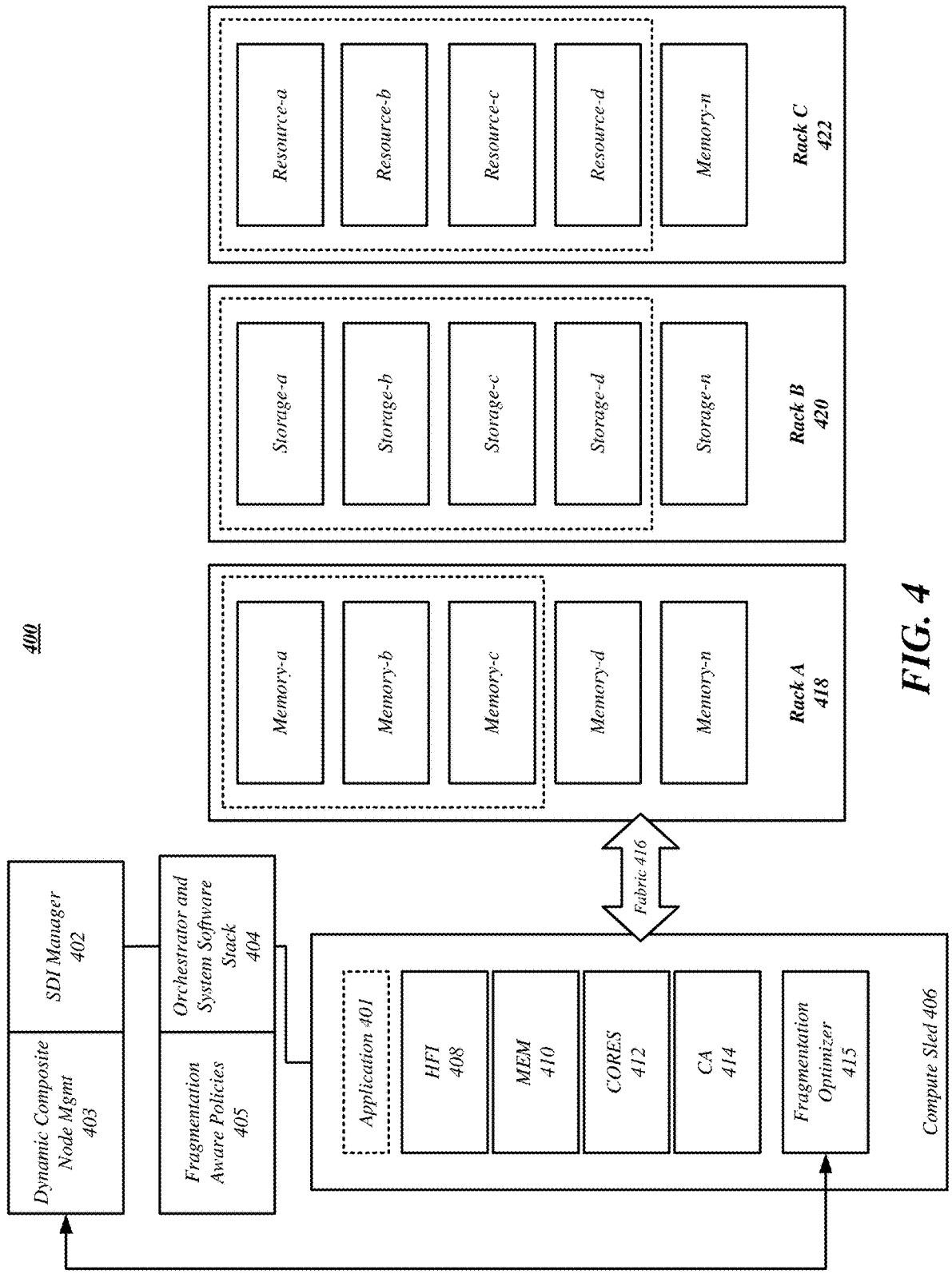
FIG. 4 illustrates a block diagram of a system according to an embodiment.

FIG. 4 illustrates a block diagram of a system 400 according to an embodiment. System 400 may include similar elements and numbering to FIG. 3, with the addition of elements targeted at reducing the impact of static and/or dynamic fragmentation, as described above. In some embodiments, the SDI manager 402 may allow for the specification of dynamic tolerated fragmentation (DTF) associated with a composite node. The DTF may be provided to the compute sled 406 when the composite node is assembled, for example. In some embodiments, DTF may be provided by an application 401 using an interface. In other embodiments, an application 401 may request resources via an interface and another component, such as the SDI manager 402 or orchestrator 404, may determine the DTF and provide to the compute sled 406. In some embodiments, DTF may be a range of measured dynamic distance tolerated by the application for each of the resources, as well as dispersion, which may be defined using different metrics such as standard deviation, interquartile range (IQR), and the like. Dynamic distance may be measured in terms of latency (units of time) or bandwidth, for example. By way of example, and not limitation, an application may specify that the tolerated fragmentation for memory is between: (1) [300 ns, 1200 ns] and 100 ns of standard deviation between the different memory pools associated to the composite node for latency; and/or (2) [2 GB/sec, 8 GB/sec] and 0.5 GB/sec standard deviation between the different memory pools for bandwidth. Within the range, the worst bound (upper bound for latency and lower bound for bandwidth) may be used as a threshold to mark the limit after which further actions may need to be taken. The best bound (lower bound for latency and higher bound for bandwidth) may be used as an indication to let the SDI manager know that improved resources are not necessary, for example, since that could require a more expensive SLA while not providing better performance. Dynamic tolerated fragmentation may be seen as a mechanism to specify QoS in the context of node fragmentation. In other words, it allows for control of how the static fragmentation associated with the composed node changes over time and may limit the impact of dynamic nature of the architecture.

A fragmentation optimizer 415 may be included within the compute sled 406, which may be responsible for tracking how fragmentation changes over time. The fragmentation optimizer 415 may track distance changes (latency and bandwidth) per each resource type associated to the composite node potentially provided by multiple pools. The fragmentation optimizer 415 may track both metrics for each resource and different pools, and store as appropriate within a computer-readable storage medium. If the distance is outside the specified dynamic tolerated fragmentation, the fragmentation optimizer 415 may contact the system layer (OS or orchestrator 404) determine what action to take, and contact the SDI manager 402 in order to dynamically change the composite node definition in order to fulfill the requirements. This last option may be enabled, tuned, and configured by the software stack in some embodiments.

The SDI manager 402 may be extended with dynamic composite node management logic 403 and interface that may allow the compute sled 406 to negotiate for dynamic changes on a composite node. Using the techniques describes above, the compute sled 406 may decide to increase or change a subset of the physical resources associated to the composite node. The SDI manager 402 may be responsible for negotiating with the compute sled 406 to increase the amount of the resource violating the tolerated fragmentation or change the actual pool being used to satisfy the sled. If the request cannot be satisfied, the SDI manager 402 or the compute sled 406 may notify the software stack (one or more of application 401, OS, or orchestrator 404) that a particular tolerated fragmentation for a given composite node has exceeded and that the SDI cannot satisfy it. This logic may be deactivated in some embodiments and, if so, orchestrator 404 may perform a similar role.

Along these lines, in some embodiments, fabric 416 and orchestrator 404 may be extended to support these techniques. For example, fabric 416 may include one or more handshaking mechanisms used to dynamically extend or change resources associated with a composite node. Likewise, orchestrator 404 may include fragmentation aware policies 405, which may be compatible with de-fragmentation techniques described herein. The orchestration may be extended in order to understand the concept of static and dynamic fragmentation. The resource selection policies as well as the interfaces provided to users may accommodate the semantics associated with the described techniques. Thus, users may specify requirements with regards to fragmentation and orchestrators may use them in the process or resource selection policies (e.g., decide what resources are used to create the composite nodes) and to assure a given QoS (e.g., check during runtime that dynamic tolerated fragmentation is not violated and taking the corresponding actions when they happen).

Figure 5:
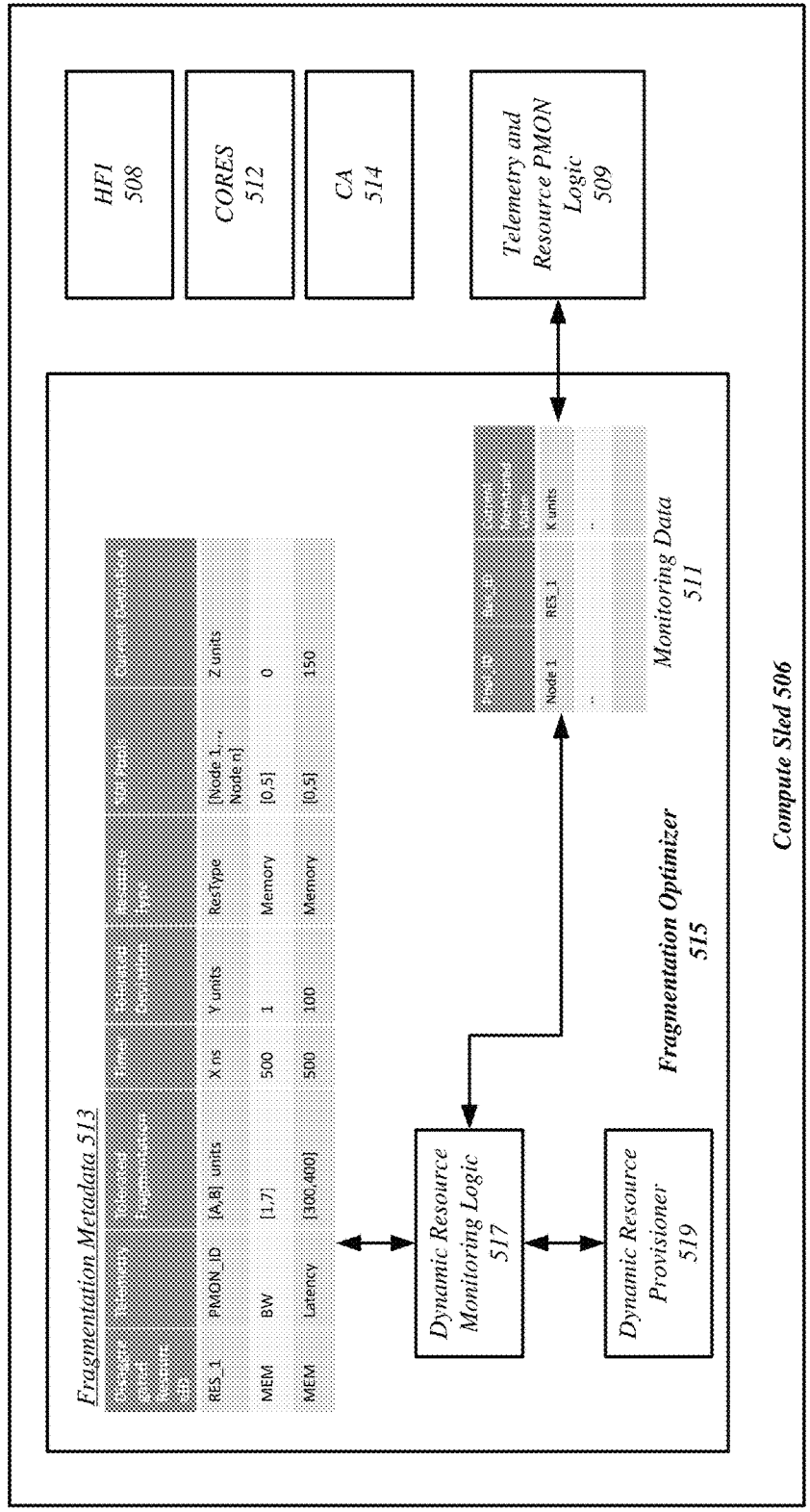
FIG. 5 illustrates a block diagram of a system according to an embodiment.

FIG. 5 illustrates a block diagram of a system according to an embodiment. System 1400 illustrates compute sled 506 and fragmentation optimizer 515, which may include fragmentation metadata 513 and monitoring data 511. Fragmentation metadata may include a resource identifier, telemetry information, tolerated fragmentation, timer, tolerated deviation, resource type, SDI pool identifier, and/or current deviation. As previously stated, the SDI manager may allow applications to specify a DTF associated to a composite node. In some embodiments, the DTF may be provided to the compute sled 506 when the composite node is assembled. The SDI manager may be extended as well with logic and an interface that allows the compute sled to negotiate for dynamic changes on a composite node. This interface may allow the compute sled to require increasing the amount for a particular resource type (i.e., memory), and remove a particular pool serving a particular resource to the composite node and request to find a new one that satisfies the composite node requirements in terms of fragmentation.

In an embodiment, the SDI manager may have telemetry data, stored within fragmentation metadata 513, which may provide the current load and performance that a given resource is likely to provide to the composite node, such as bandwidth and/or latency. As an example instruction using this interface, a request may be made as follows: "Memory provided by memory server Pool 1 is underperforming. Find a new memory server that can provide Memory Bandwidth within a range of 1.7 GB/sec." The previous interfaces may be used by the fragmentation optimizer if implemented on the architecture or by the orchestrator. In the second case, it is assumed that software acting on behalf of the orchestrator is running in the composite node is able to detect when tolerated fragmentation is violated. Furthermore, it may also be possible to send requests the SDI manager to use the two previous interfaces.

Fragmentation optimizer 515 may be responsible for monitoring and tracking how dynamic fragmentation all the resources associated to the composite node evolves over time. In an embodiment, each resource may have an associated set of monitors, such as dynamic resource monitor 517, which may define the tolerated fragmentation, stored within fragmentation metadata 513. A monitor may include: the ID corresponding to the resource being monitored, the telemetry field associated to that particular monitor, the tolerated fragmentation that is tolerated to each of the pools providing access to that particular resource (i.e., Node 1 and Node 2 must provide 1.7 GB/sec of memory bandwidth), the timer that specifies for how long the logic has to wait to take any action, or a timer plus additional logic (i.e., generate SW interrupt or use the dynamic resource provider) when the tolerated fragmentation is violated), the deviation that is tolerated among all the different pools (i.e., the standard deviation tolerated in memory BW provided by Node 1 and Node must be within 1 GB/sec), the resource type, the SDI pools/servers that are providing that particular resource (i.e., Node 1 and Node 2 are providing the memory), and the current deviation across all the resource providers at that particular time. In an example, if the current deviation is higher than the tolerate fragmentation for more than "Timer" time, the fragmentation optimizer 515 may contact to the software stack or the dynamic resource provider. Rather than current deviation, in some embodiments, current performance may be used, and in other embodiments, both current deviation and metrics for current performance may be used.

Fragmentation optimizer 515 may additionally take corresponding actions if the tolerated fragmentation is violated. As has been just described, the composite node may be configured to automatically try to resolve the problem by using the dynamic resource provisioner 519 or it may notify to the software interrupt to the software stack. The dynamic resource provisioner 519 may be optional in some embodiments. The dynamic resource provisioner 519, once it gets a notification from the dynamic resource monitoring logic 517 that a particular DTF has been violated it may interact with the SDI manager to fix the violation. Fragmentation optimizer 515 may, in some embodiments, send information to the SDI manager such that it is kept updated in order to improve its future decisions for violation resolutions. The period of the updates may be variable and may depend on whether the previous information is outdated or the fabric or the SDI manager seems congested. Therefore, the SDI manager has an overall picture to improve the heuristics for the decision-making but it has not perfect information in order to keep verbosity low.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
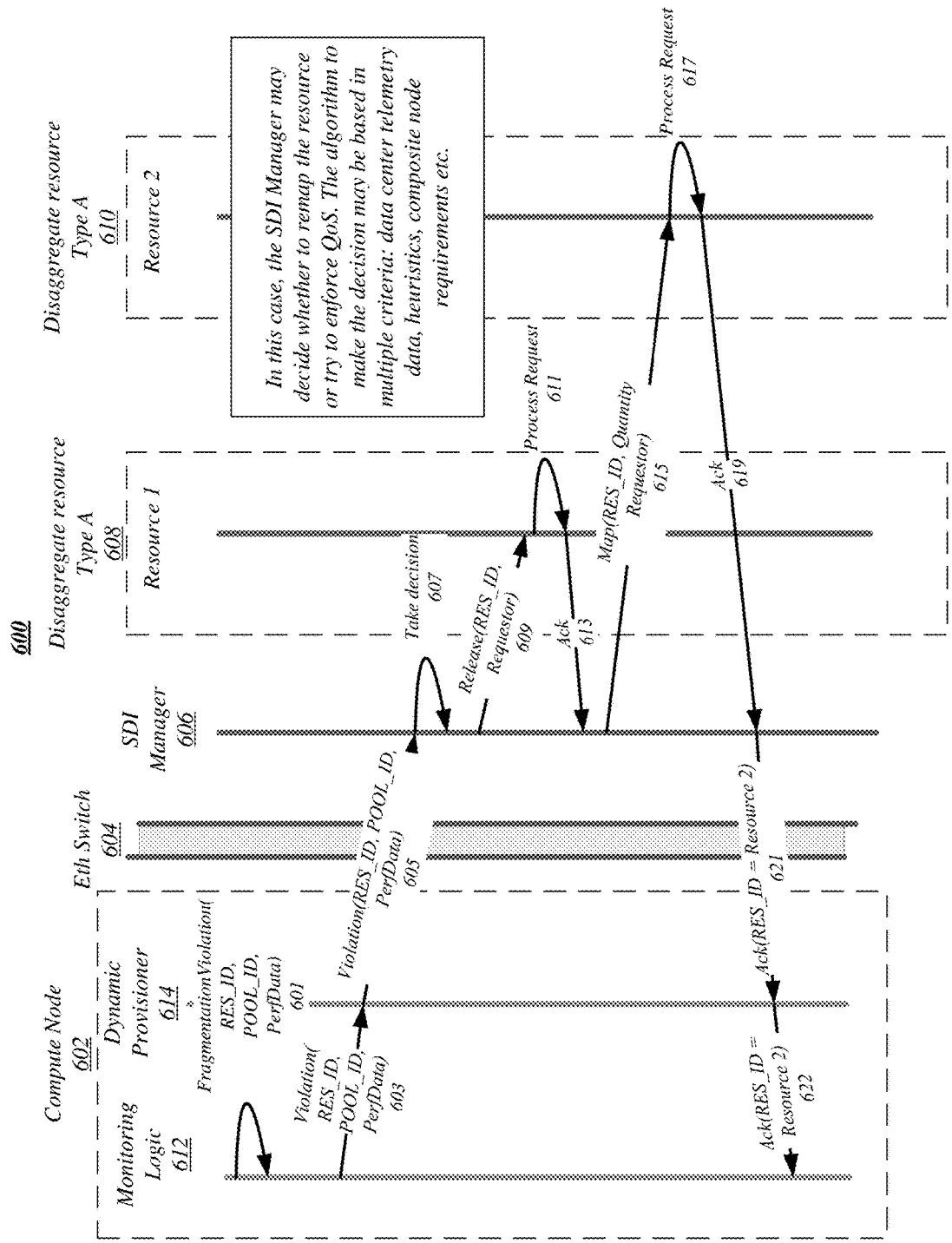
FIG. 6 illustrates a logic flow according to an embodiment.

FIG. 6 illustrates a logic flow 600 according to an embodiment. As illustrated, a compute node 602 includes monitoring logic 612 and dynamic provisioner 614. Compute node 602 may be connected via fabric 604, and SDI manager 606 to one or more disaggregated resources 608 and 610, which are illustrated as separate resources of the same type. However, it can be appreciate that resources of various types may be used in certain embodiments.

Monitoring logic 612 may be configured to monitor available resources as described herein until a fragmentation violation 601 is discovered. The dynamic resource provisioner 614 may be notified of the violation at 603, and, at 605, may determine to delegate to the SDI manager 606 the decision on whether extend or remap the given resource that is subject to the violation. In some embodiments, this may be the default option since the SDI manager 606 may have more information about the overall status of the system. However, as described below, the dynamic resource provisioner 614 may make such a decision in some embodiments. Along with the request, the compute node 602 may indicate the resource that needs to be addressed so that one of a plurality of default actions may be performed to address the violation. For example, the default behavior for latency violations may be to reallocate resources closer to the compute node 602 while the default behavior for bandwidth violations may be to enforce QoS to guarantee bandwidth. However, in both cases, the default option may not be feasible due to lack of resources, or otherwise. Therefore the other (either reallocation or enforcement of QoS) may need to be taken, or none at all if it is not possible to meet the requirements. If no action may be taken, the software stack may be notified.

In some embodiments, SDI manager 606 may be responsible for determining the action to be taken when a violation has been detected, since the SDI manager 606 may be apprised of the overall system status. At 607, SDI manager 606 may accept the responsibility for making a decision. The algorithm for decision-making may be based upon one or more of multiple criteria: data center telemetry data, heuristics, or composite node requirements, for example. The SDI manager 606, in an embodiment, may decide to change other composite nodes being underutilized if this helps to meet the requirements of the requestor. As illustrated, the compute node 602 may send performance data along with the request since the SDI manager 606 may not have the most updated data.

In the example of FIG. 6, SDI manager 606 determines that resource 608 should be released at 609, which is processed by resource 608 at 611, and acknowledged by resource 608 at 613. A mapping instruction may be sent to resource 610 by SDI manager 606 at 615, which may be processed at 617 and acknowledged at 619. At 621 and 622, SDI manager 606 may respond with an acknowledgement via dynamic provisioner 614 to compute node 602 once the operation is performed, which may identify the action taken and that it may result in remapping from resource 608 to resource 610.

Figure 7:
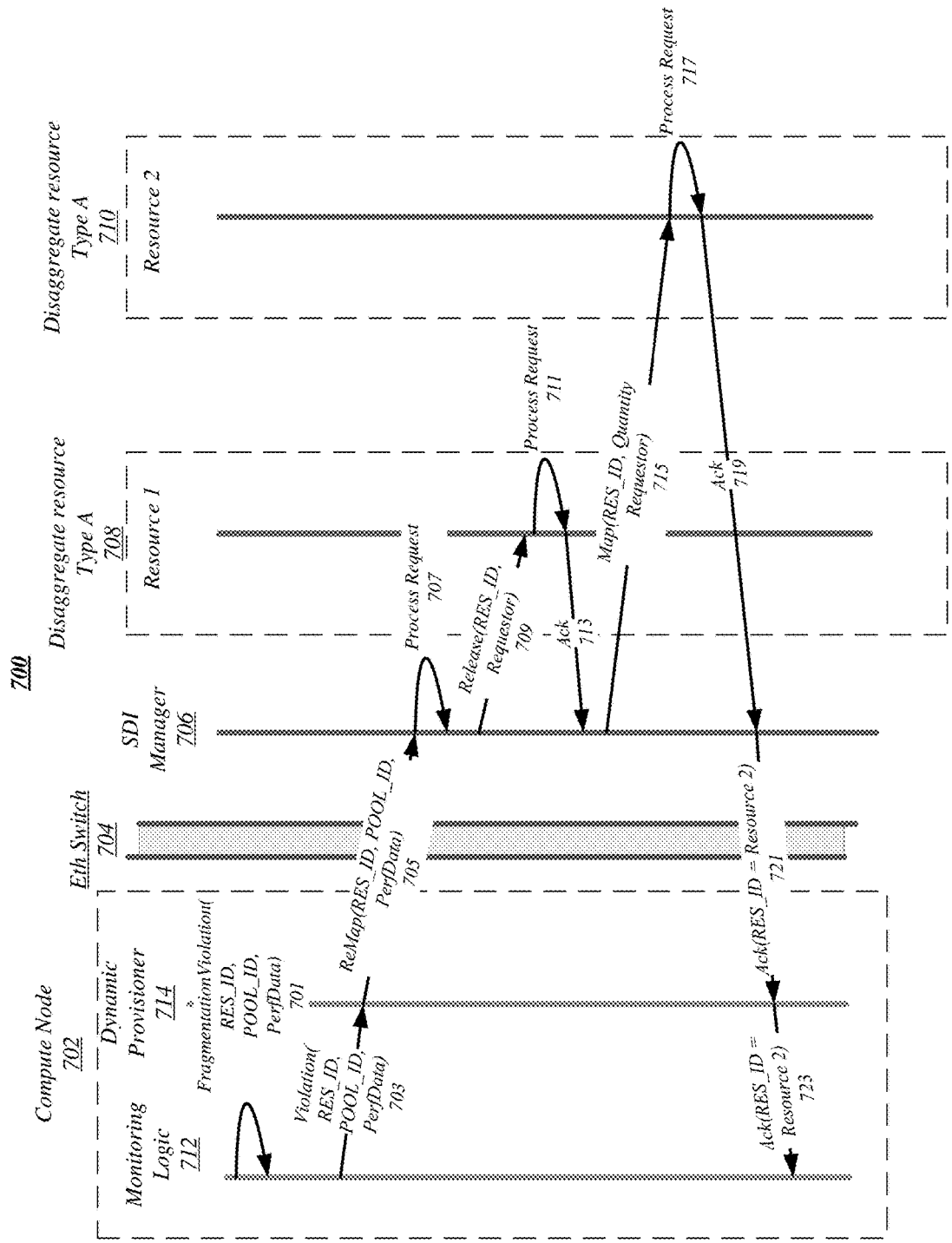
FIG. 7 illustrates a logic flow according to an embodiment.

FIG. 7 illustrates a logic flow 700 according to an embodiment. In logic flow 700, which includes like-numbered elements to that illustrated within FIG. 6, compute node 702 may include monitoring logic 712 and dynamic provisioner 714. Compute node 702 may be connected via fabric 704 to SDI manager 706 and resources 708 and 710. Using the techniques set forth herein, monitoring logic 712 may determine that a fragmentation violation has occurred at 701, and receive information about the violation from monitoring logic 712 at 703. At 705, dynamic provisioner 714 may determine to perform a remapping of resources, for example, to maintain a DTF required by compute node 702. The remapping instruction may be sent to SDI manager 706 and processed by SDI manager 706 at 707.

As described above, dynamic provisioner 714 may decide to remap the resource that was provided by a given pool to another pool. This option may be used when the dynamic provisioner 714 determines the best option is to remap or because the required DTF has changed. As illustrated, dynamic provisioner 714 may ask the SDI manager 706 to remap that particular resource. The SDI manager 706 may decide to what pool the resource needs to be remapped, or may receive that determination from dynamic provisioner 714. In the example of FIG. 7, dynamic provisioner 714 determines that resource 708 should be released at 705, which is sent via SDI manager 706 at 709, processed by resource 708 at 711, and acknowledged by resource 708 at 713. A mapping instruction may be sent to resource 710 by SDI manager 706 at 715, which may be processed at 717 and acknowledged at 719. At 721 and 722, SDI manager 706 may respond with an acknowledgement via dynamic provisioner 614 to compute node 702 once the operation is performed, which may identify the action taken and that it may result in remapping from resource 708 to resource 710.

Figure 8:
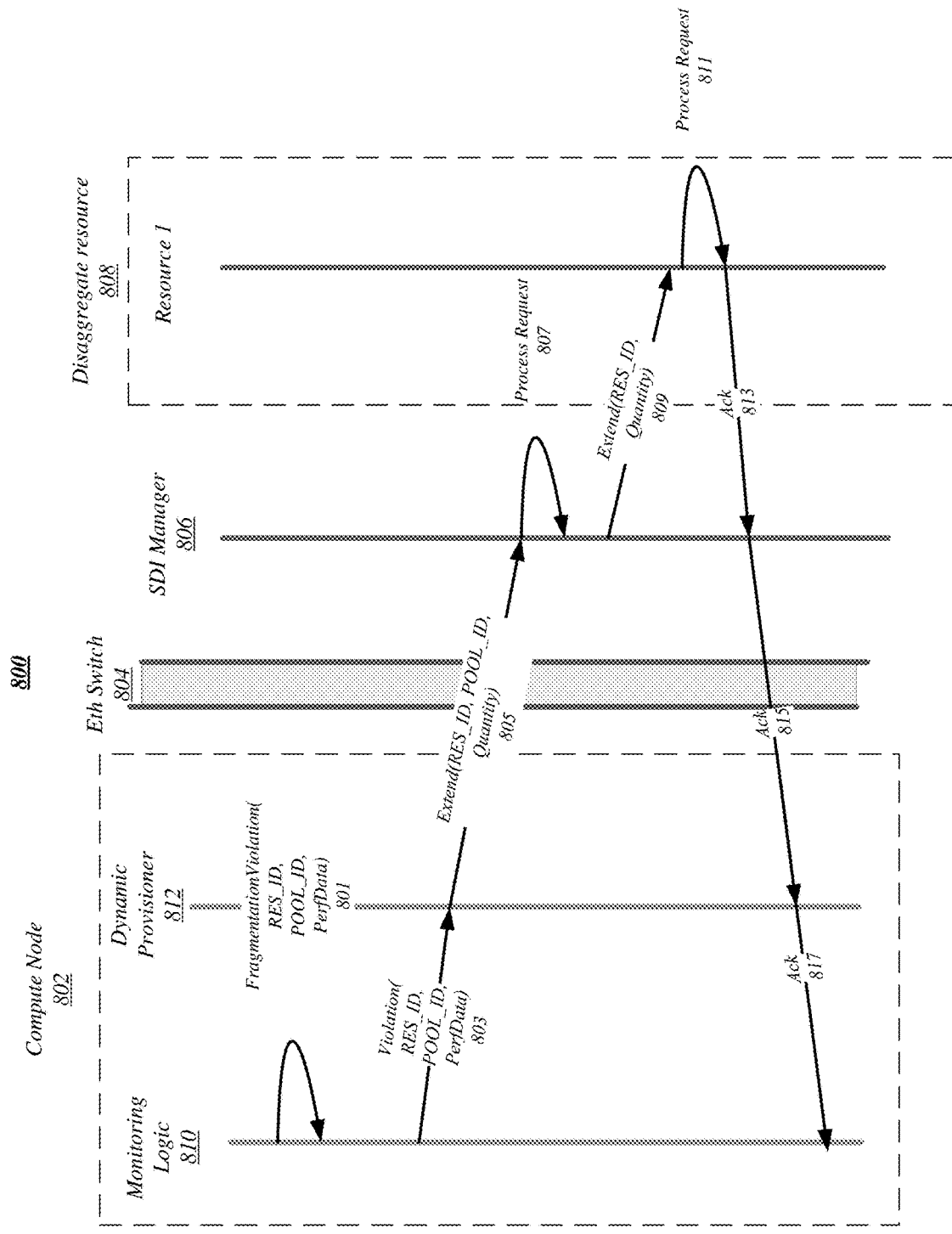
FIG. 8 illustrates a logic flow according to an embodiment.

FIG. 8 illustrates a logic flow 800 according to an embodiment. In logic flow 800, compute node 803 may include monitoring logic 810 and dynamic provisioner 812. Compute node 802 may be connected via fabric 804 to SDI manager 806 and resource 808. Using the techniques set forth herein, monitoring logic 810 may determine that a fragmentation violation has occurred at 801, and receive information about the violation from monitoring logic 812 at 803. Rather than remapping resources, as described with respect to FIGS. 6 and 7, dynamic provisioner 812 may decide that an extension of the amount of resources for a particular pool needs to be increased. This option may be used when the dynamic provisioner 812 determines that the best option is to extend the amount of resources, for example, when the default option is to extend and/or a fast response is needed.

At 805, an extend instruction may be received by SDI manager 806 from dynamic provisioner 812, which may be processed by SDI manager 806 at 807. Resource 808 may receive an extend instruction at 809 from SDI manager 806, and may process the instruction at 811. Acknowledgments of the extension of resources being processed may be received by SDI manager 806 at 813, dynamic provisioner 812 at 815, and monitoring logic 810 at 810.

Figure 9:
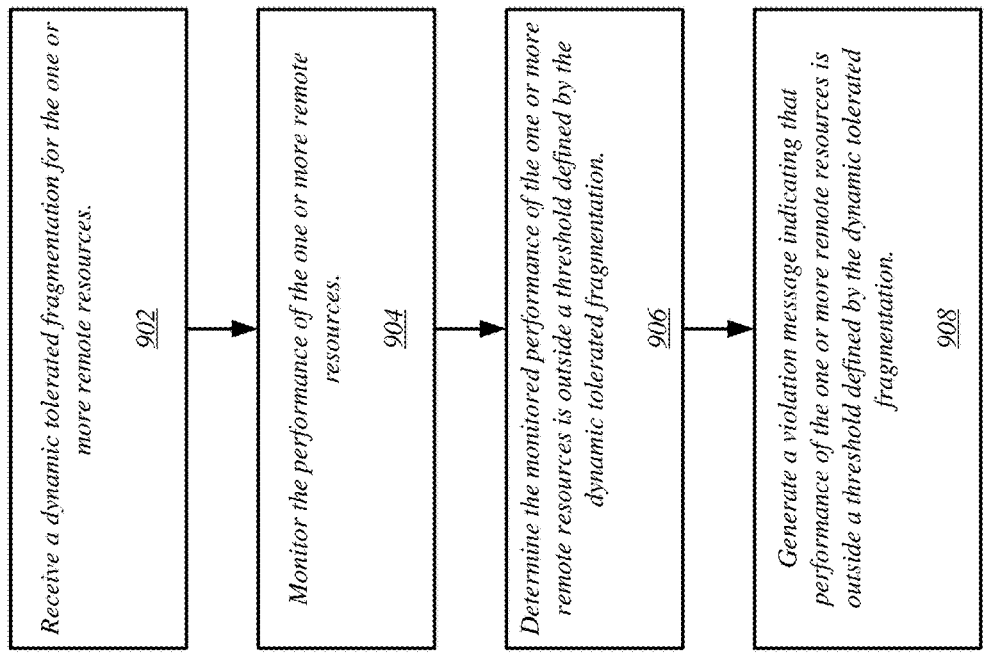
FIG. 9 illustrates a logic flow according to an embodiment.

FIG. 9 illustrates a logic flow 900 according to an embodiment. At 902, a compute node, including one or more processor circuits, configured to access one or more remote resources via a fabric, the compute node may be configured to receive a dynamic tolerated fragmentation for the one or more remote resources. In some embodiments, the dynamic tolerated fragmentation may include a range of dynamic distance, which may presented in terms of a range of bandwidth and/or a range of latency. Further, in some embodiments, the dynamic tolerated fragmentation may include a standard deviation. A fragmentation optimizer component may be present within some compute nodes, and responsible for one or more portions of logic flow 900.

At 904, the compute node may be configured to monitor the performance of the one or more remote resources. For example, the compute node may be configured to monitor if one or more of the monitored resources were to exceed a threshold bandwidth or latency range as defined by the dynamic tolerated fragmentation. In an example, the dynamic tolerated fragmentation may include a time component, and resources may be monitored to determine if a threshold is exceeded for a predetermined period of time. Further, a standard deviation may be used to monitor the performance of one or more remote resources.

At 906, the compute node may be configured to determine that the monitored performance of the one or more remote resources is outside a threshold defined by the dynamic tolerated fragmentation. If one or more of the remote resources is outside the threshold, for a predetermined period of time, or otherwise, the compute node may be configured to determine so and take appropriate measures, as described herein.

At 908, the compute node may be configured to generate a violation message indicating that performance of the one or more remote resources is outside a threshold defined by the dynamic tolerated fragmentation. The violation message may identify the particular resource and the type of violation (e.g., exceeding bandwidth or latency). In some embodiments, the violation message may request remapping of a resource to a different resource and/or may request extending an existing resource. It can be appreciate that remapping and extension may be used separately, or in conjunction with one another to meet the needs of the system.

In some cases, a request for remapping and/or extending resources may be denied due to lack of resources, or otherwise. In these cases, the compute node may be configured to receive an indication that performance of the one or more remote resources cannot be changed to be within the threshold defined by the dynamic tolerated fragmentation generate a message to a software stack indicating that performance of the one or more remote resources cannot be changed to be within the threshold defined by the dynamic tolerated fragmentation.

Figure 10:
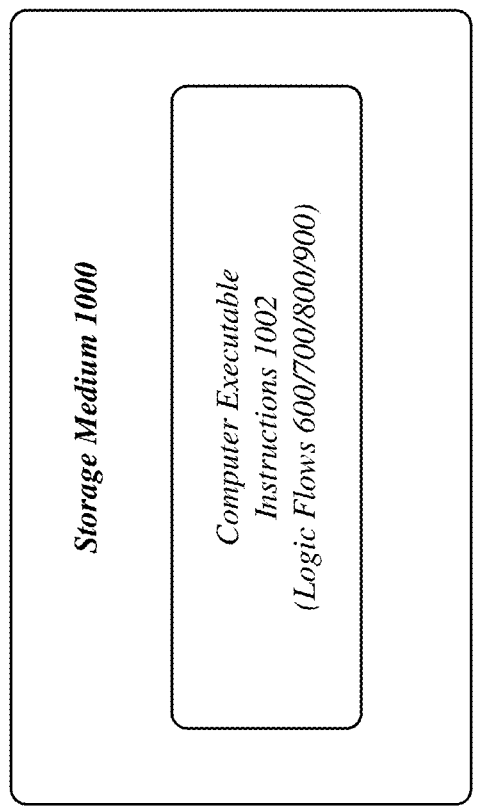
FIG. 10 illustrates an embodiment of computer-readable storage medium.

FIG. 10 illustrates an embodiment of a storage medium 1000. The storage medium 1000 may comprise an article of manufacture. In some examples, the storage medium 1000 may include any non-transitory computer readable medium or machine readable medium, such as an optical, magnetic or semiconductor storage. The storage medium 1000 may store various types of computer executable instructions e.g., 1002). For example, the storage medium 2700 may store various types of computer executable instructions to implement logic flows described herein using one or more processors and components described herein, such as logic flow 600, 600, 800, and/or 900.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
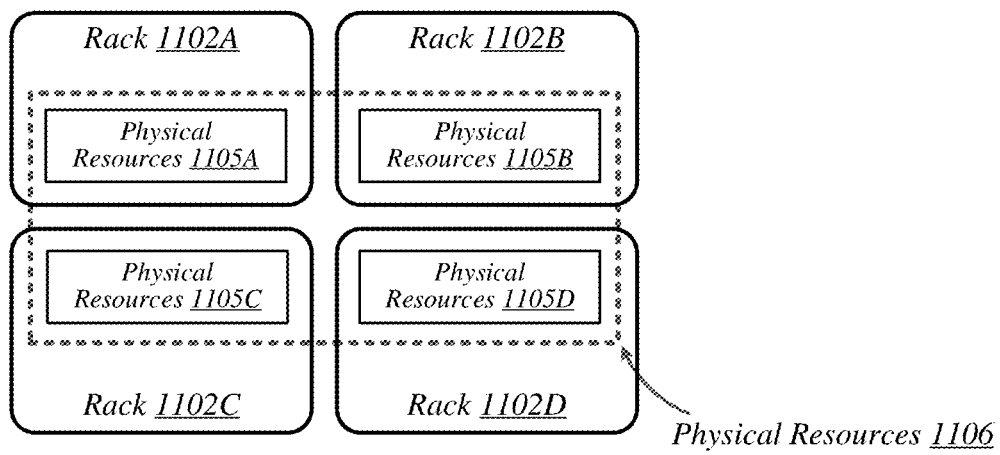
FIG. 11 illustrates an example of a data center.

FIG. 11 illustrates a conceptual overview of a data center 1100 that may generally be representative of a data center or other type of computing network in/for which one or more techniques described herein may be implemented according to various embodiments. As shown in FIG. 11, data center 1100 may generally contain a plurality of racks, each of which may house computing equipment comprising a respective set of physical resources. In the particular non-limiting example depicted in FIG. 11, data center 1100 contains four racks 1102A to 1102D, which house computing equipment comprising respective sets of physical resources (PCRs) 1105A to 1105D. According to this example, a collective set of physical resources 106 of data center 100 includes the various sets of physical resources 1105A to 1105D that are distributed among racks 1102A to 1102D. Physical resources 1106 may include resources of multiple types, such as—for example—processors, co-processors, accelerators, field-programmable gate arrays (FPGAs), memory, and storage. The embodiments are not limited to these examples.

The illustrative data center 1100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 1102A, 1102B, 1102C, 1102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 1100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 1100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 1100 additionally receives usage information for the various resources, predicts resource usage for different types of workloads based on past resource usage, and dynamically reallocates the resources based on this information.

The racks 1102A, 1102B, 1102C, 1102D of the data center 1100 may include physical design features that facilitate the automation of a variety of types of maintenance tasks. For example, data center 1100 may be implemented using racks that are designed to be robotically-accessed, and to accept and house robotically-manipulable resource sleds. Furthermore, in the illustrative embodiment, the racks 1102A, 1102B, 1102C, 1102D include integrated power sources that receive higher current than typical for power sources. The increased current enables the power sources to provide additional power to the components on each sled, enabling the components to operate at higher than typical frequencies.

Figure 12:
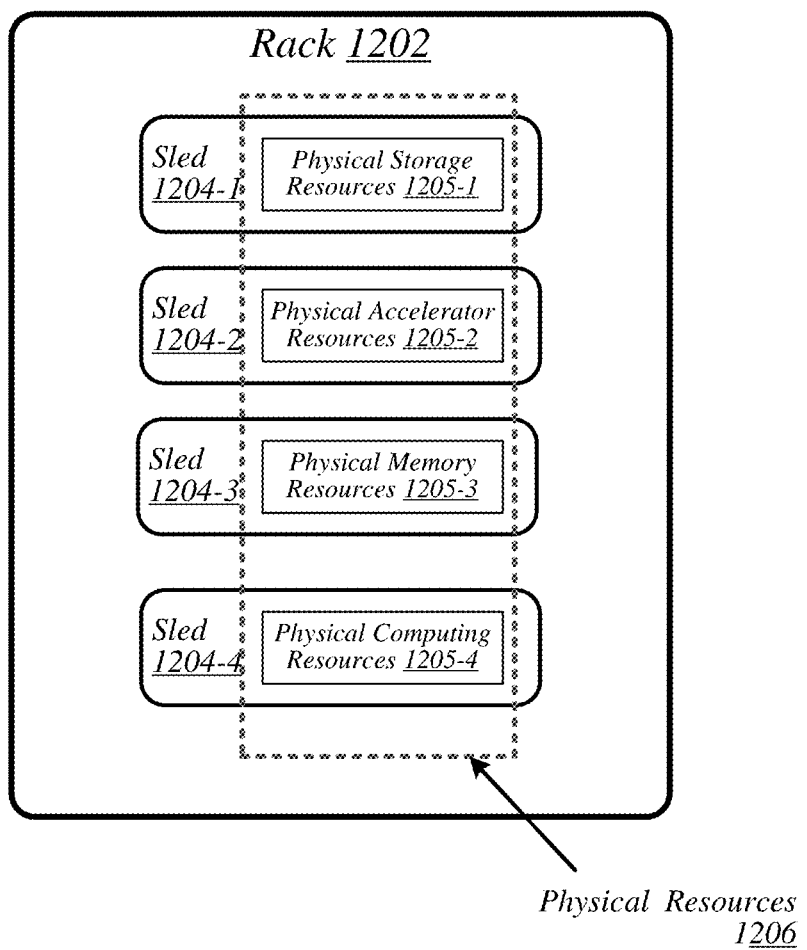
FIG. 12 illustrates an example of a rack.

FIG. 12 illustrates an exemplary logical configuration of a rack 1202 of the data center 1100. As shown in FIG. 12, rack 1202 may generally house a plurality of sleds, each of which may comprise a respective set of physical resources. In the particular non-limiting example depicted in FIG. 12, rack 1202 houses sleds 1204-1 to 1204-4 comprising respective sets of physical resources 1205-1 to 1205-4, each of which constitutes a portion of the collective set of physical resources 1206 comprised in rack 1202. With respect to FIG. 11, if rack 1202 is representative of—for example—rack 1102A, then physical resources 1206 may correspond to the physical resources 1105A comprised in rack 1102A. In the context of this example, physical resources 1105A may thus be made up of the respective sets of physical resources, including physical storage resources 1205-1, physical accelerator resources 1205-2, physical memory resources 1204-3, and physical compute resources 1205-5 comprised in the sleds 1204-1 to 1204-4 of rack 1202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 13:
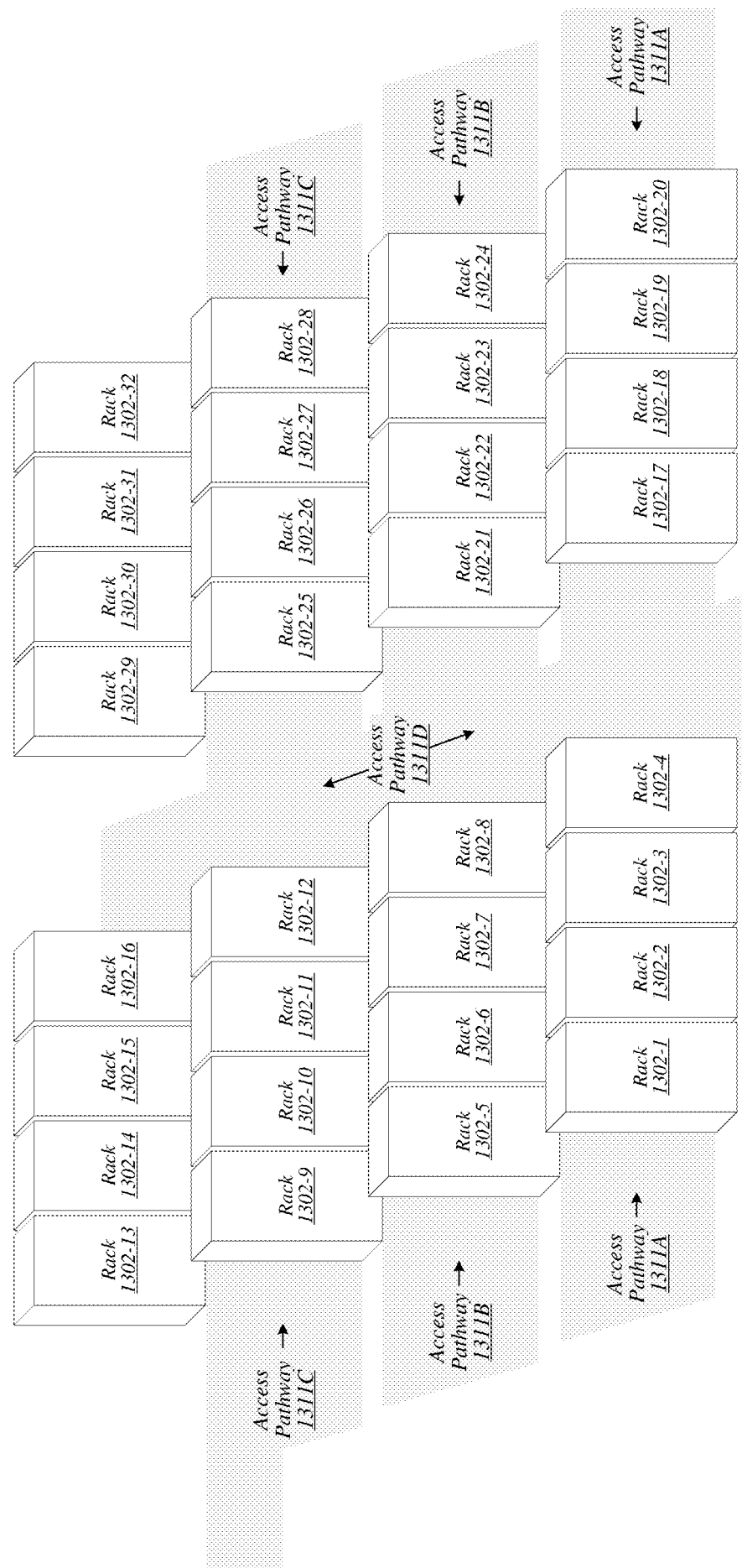
FIG. 13 illustrates an example of a data center.

FIG. 13 illustrates an example of a data center 1300 that may generally be representative of one in/for which one or more techniques described herein may be implemented according to various embodiments. In the particular non-limiting example depicted in FIG. 13, data center 1300 comprises racks 1302-1 to 1302-32. In various embodiments, the racks of data center 1300 may be arranged in such fashion as to define and/or accommodate various access pathways. For example, as shown in FIG. 13, the racks of data center 1300 may be arranged in such fashion as to define and/or accommodate access pathways 1311A, 1311B, 1311C, and 1311D. In some embodiments, the presence of such access pathways may generally enable automated maintenance equipment, such as robotic maintenance equipment, to physically access the computing equipment housed in the various racks of data center 1300 and perform automated maintenance tasks (e.g., replace a failed sled, upgrade a sled). In various embodiments, the dimensions of access pathways 1311A, 1311B, 1311C, and 1311D, the dimensions of racks 1302-1 to 1302-32, and/or one or more other aspects of the physical layout of data center 1300 may be selected to facilitate such automated operations. The embodiments are not limited in this context.

Figure 14:
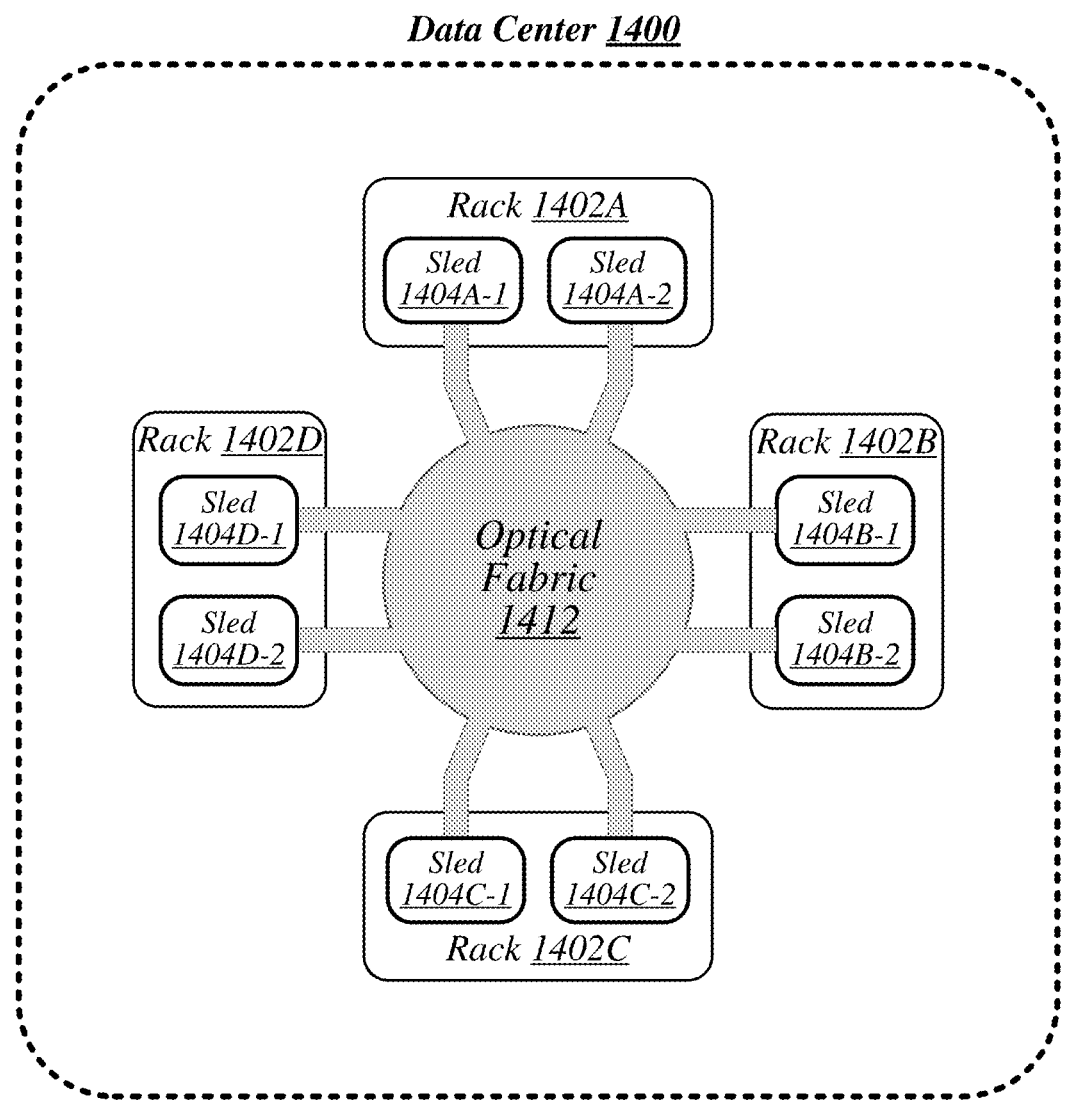
FIG. 14 illustrates an example of a data center.

FIG. 14 illustrates an example of a data center 1400 that may generally be representative of one in/for which one or more techniques described herein may be implemented according to various embodiments. As shown in FIG. 14, data center 1400 may feature an optical fabric 1412. Optical fabric 1412 may generally comprise a combination of optical signaling media (such as optical cabling) and optical switching infrastructure via which any particular sled in data center 1400 can send signals to (and receive signals from) each of the other sleds in data center 1400. The signaling connectivity that optical fabric 1412 provides to any given sled may include connectivity both to other sleds in a same rack and sleds in other racks. In the particular non-limiting example depicted in FIG. 14, data center 1400 includes four racks 1402A to 1402D. Racks 1402A to 1402D house respective pairs of sleds 1404A-1 and 1404A-2, 1404B-1 and 1404B-2, 1404C-1 and 1404C-2, and 1404D-1 and 1404D-2. Thus, in this example, data center 1400 comprises a total of eight sleds. Via optical fabric 1412, each such sled may possess signaling connectivity with each of the seven other sleds in data center 1400. For example, via optical fabric 1412, sled 1404A-1 in rack 1402A may possess signaling connectivity with sled 1404A-2 in rack 1402A, as well as the six other sleds 1404B-1, 1404B-2, 1404C-1, 1404C-2, 1404D-1, and 1404D-2 that are distributed among the other racks 1402B, 1402C, and 1402D of data center 1400. The embodiments are not limited to this example.

Figure 15:
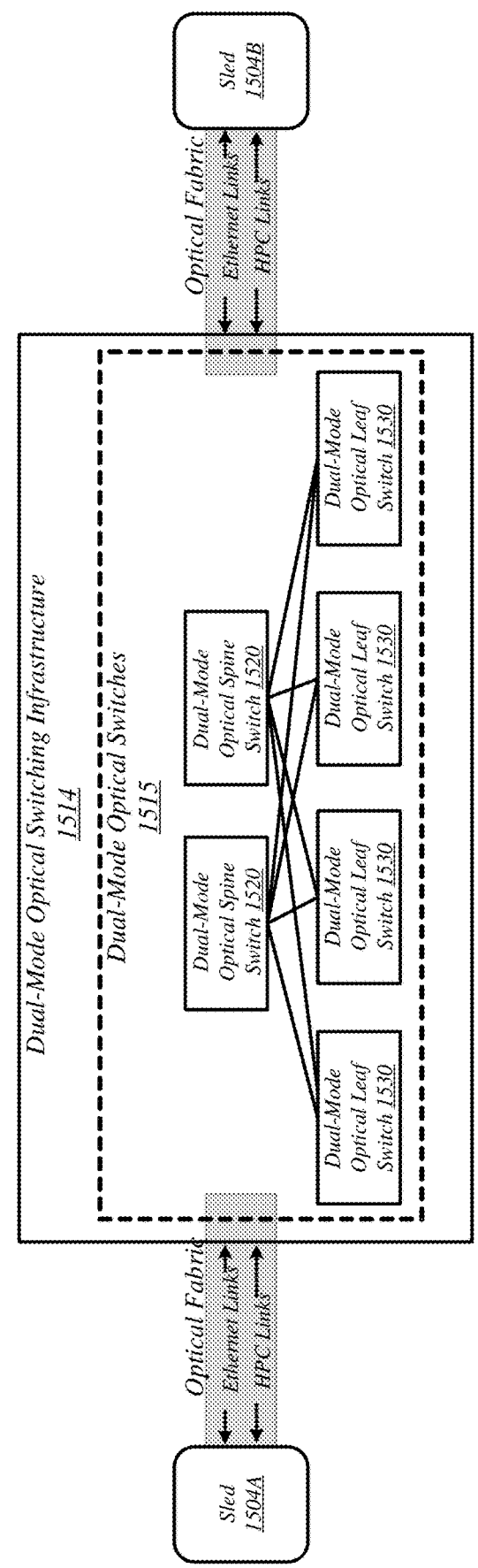
FIG. 15 illustrates an example of a switching infrastructure.

FIG. 15 illustrates an overview of a connectivity scheme 1500 that may generally be representative of link-layer connectivity that may be established in some embodiments among the various sleds of a data center, such as any of example data centers 1100, 1300, and 1400 of FIGS. 11, 13, and 14. Connectivity scheme 1500 may be implemented using an optical fabric that features a dual-mode optical switching infrastructure 1514. Dual-mode optical switching infrastructure 1514 may generally comprise a switching infrastructure that is capable of receiving communications according to multiple link-layer protocols via a same unified set of optical signaling media, and properly switching such communications. In various embodiments, dual-mode optical switching infrastructure 1514 may be implemented using one or more dual-mode optical switches 1515. In various embodiments, dual-mode optical switches 1515 may generally comprise high-radix switches. In some embodiments, dual-mode optical switches 1515 may comprise multi-ply switches, such as four-ply switches. In various embodiments, dual-mode optical switches 1515 may feature integrated silicon photonics that enable them to switch communications with significantly reduced latency in comparison to conventional switching devices. In embodiments, the dual-mode switch may be a single physical network wire that may be capable of carrying Ethernet or Omni-Path communication, which may be auto-detected by the dual-mode optical switch 1515 or configured by the Pod management controller. This allows for the same network to be used for Cloud traffic (Ethernet) or High Performance Computing (HPC), typically Omni-Path or Infiniband. Moreover, and in some instances, an Omni-Path protocol may carry Omni-Path communication and Ethernet communication. In some embodiments, dual-mode optical switches 1515 may constitute leaf switches 1530 in a leaf-spine architecture additionally including one or more dual-mode optical spine switches 1520. Note that in some embodiments, the architecture may not be a leaf-spine architecture, but may be a two-ply switch architecture to connect directly to the sleds.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 15, with respect to any particular pair of sleds 1504A and 1504B possessing optical signaling connectivity to the optical fabric, connectivity scheme 1500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 16:
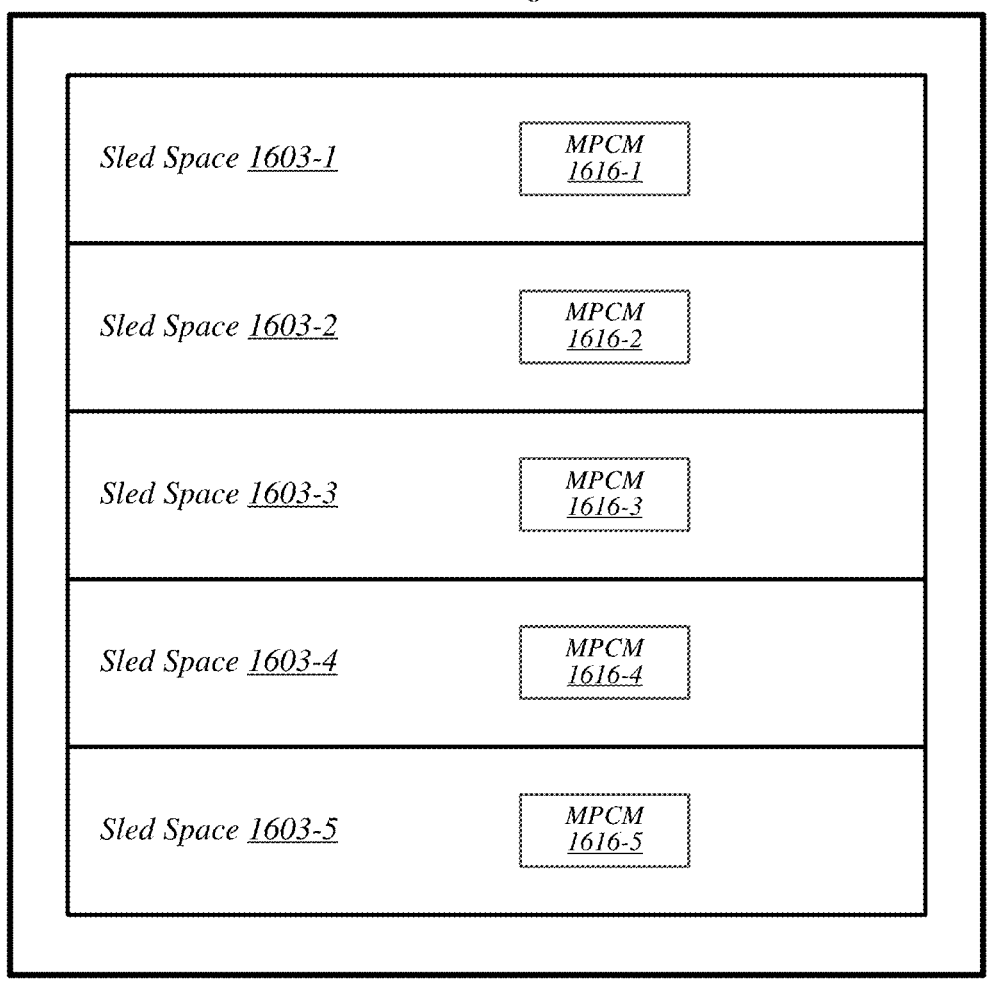
FIG. 16 illustrates an example of a data center.

FIG. 16 illustrates a general overview of a rack architecture 1600 that may be representative of an architecture of any particular one of the racks depicted in FIGS. 11 to 14 according to some embodiments. As reflected in FIG. 16, rack architecture 1600 may generally feature a plurality of sled spaces into which sleds may be inserted, each of which may be robotically-accessible via a rack access region 1601. In the particular non-limiting example depicted in FIG. 16, rack architecture 1600 features five sled spaces 1603-1 to 1603-5. Sled spaces 1603-1 to 1603-5 feature respective multi-purpose connector modules (MPCMs) 1616-1 to 1616-5. In some instances, when a sled is inserted into any given one of sled spaces 1603-1 to 1603-5, the corresponding MPCM may couple with a counterpart MPCM of the inserted sled. This coupling may provide the inserted sled with connectivity to both signaling infrastructure and power infrastructure of the rack in which it is housed.

Figure 17:
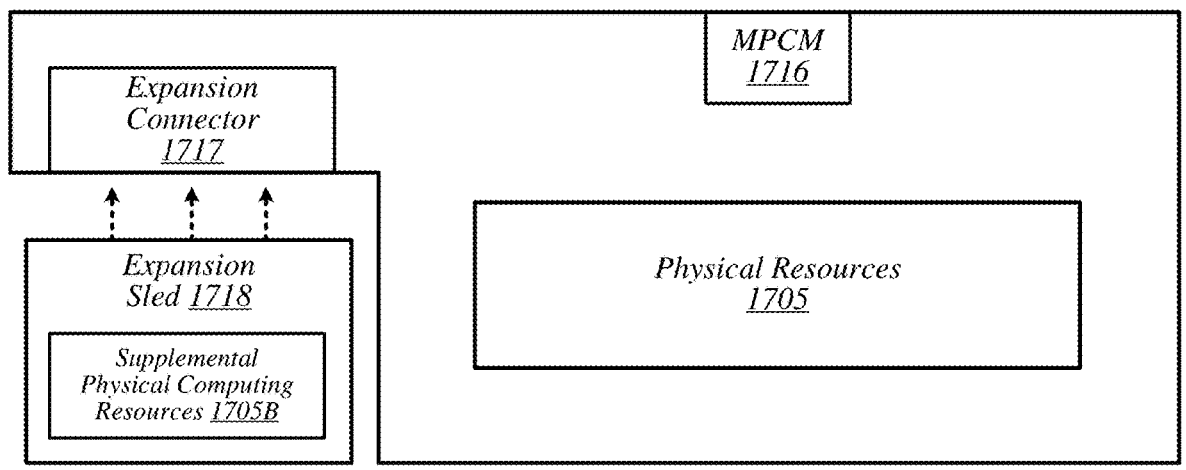
FIG. 17 illustrates an example of a sled.

Included among the types of sleds to be accommodated by rack architecture 1600 may be one or more types of sleds that feature expansion capabilities. FIG. 17 illustrates an example of a sled 1704 that may be representative of a sled of such a type. As shown in FIG. 17, sled 1704 may comprise a set of physical resources 1705, as well as an MPCM 1716 designed to couple with a counterpart MPCM when sled 1704 is inserted into a sled space such as any of sled spaces 1603-1 to 1603-5 of FIG. 16. Sled 1704 may also feature an expansion connector 1717. Expansion connector 1717 may generally comprise a socket, slot, or other type of connection element that is capable of accepting one or more types of expansion modules, such as an expansion sled 1718. By coupling with a counterpart connector on expansion sled 1718, expansion connector 1717 may provide physical resources 1705 with access to supplemental computing resources 1705B residing on expansion sled 1718. The embodiments are not limited in this context.

Figure 18:
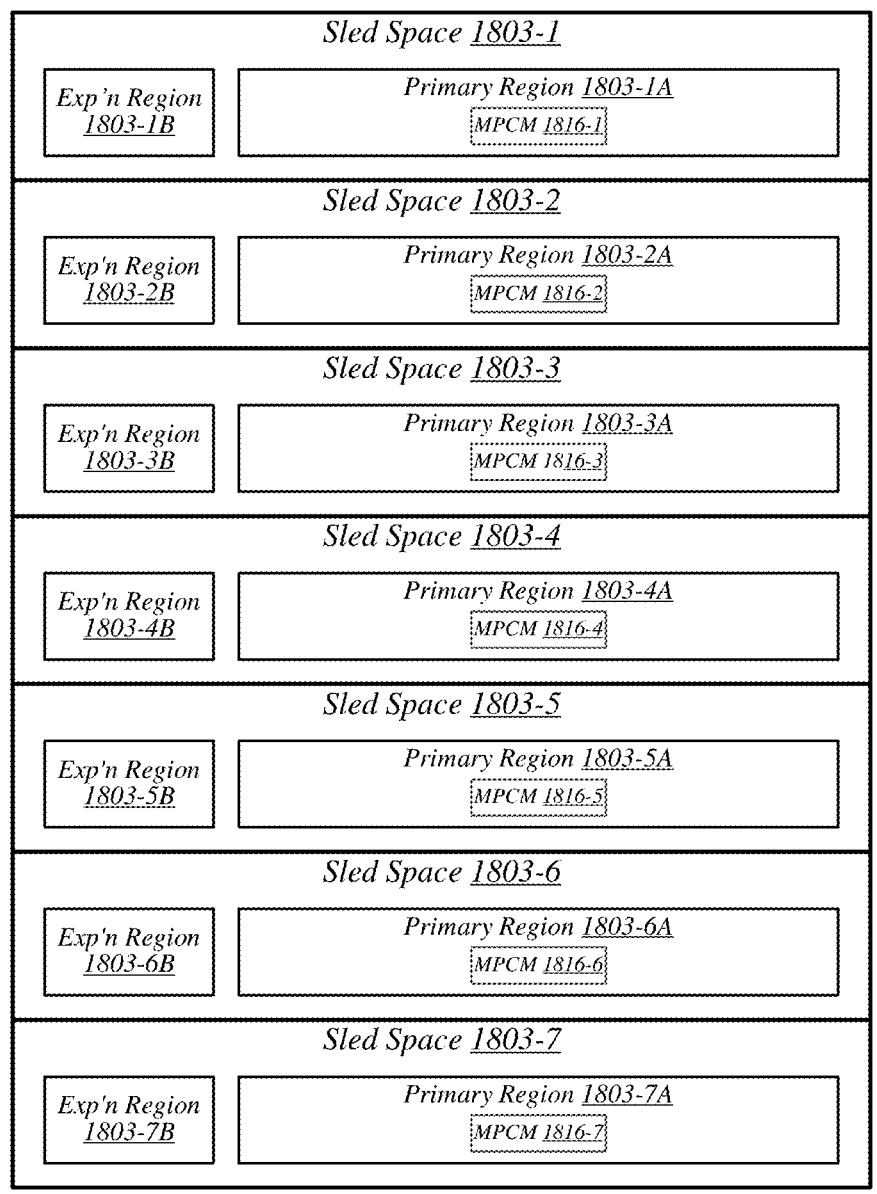
FIG. 18 illustrates an example of a data center.

FIG. 18 illustrates an example of a rack architecture 1800 that may be representative of a rack architecture that may be implemented in order to provide support for sleds featuring expansion capabilities, such as sled 1704 of FIG. 17. In the particular non-limiting example depicted in FIG. 18, rack architecture 1800 includes seven sled spaces 1803-1 to 1803-7, which feature respective MPCMs 1816-1 to 1816-7. Sled spaces 1803-1 to 1803-7 include respective primary regions 1803-1A to 1803-7A and respective expansion regions 1803-1B to 1803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 1718 of FIG. 17, in the event that the inserted sled is configured with such a module.

Figure 19:
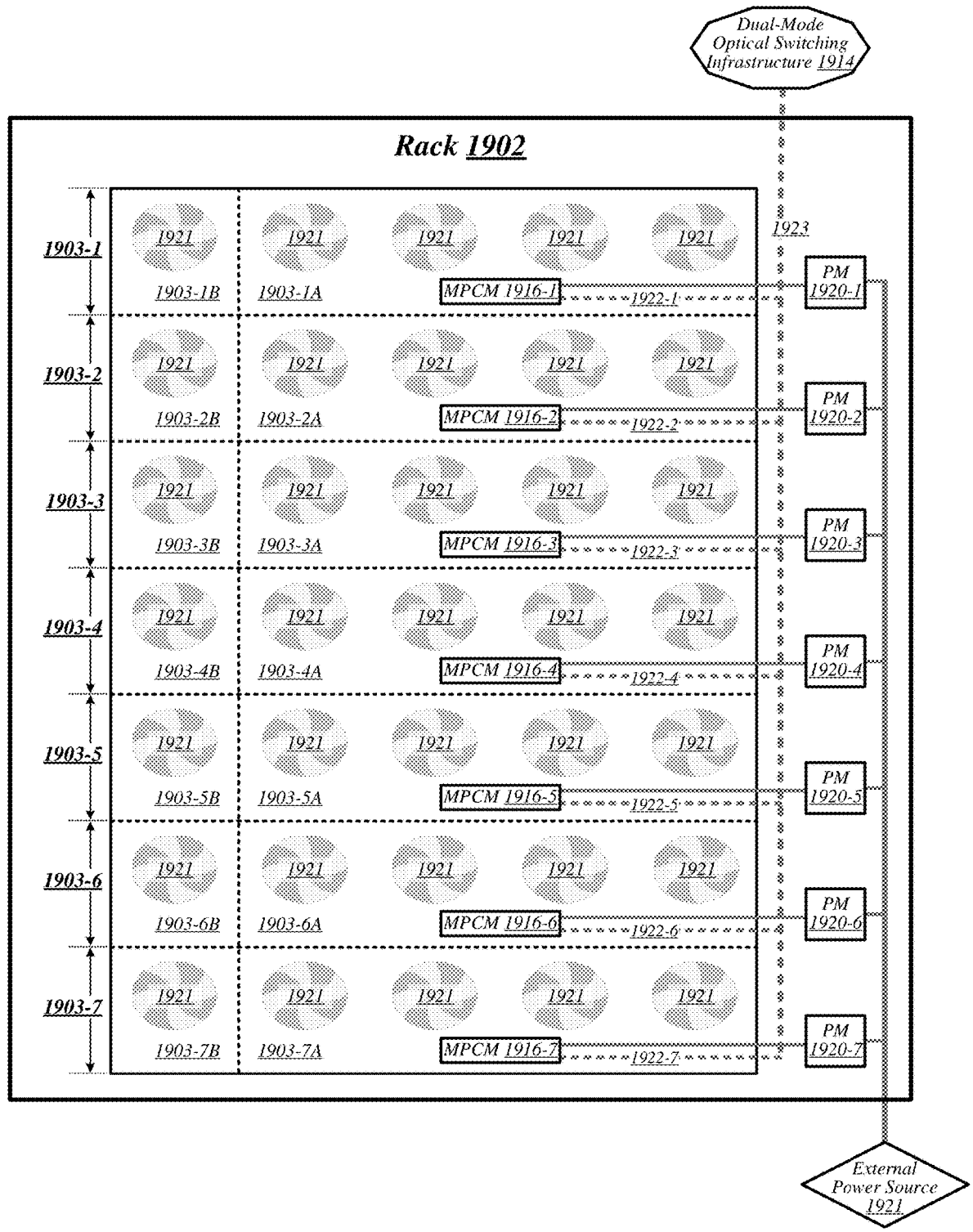
FIG. 19 illustrates an example of a data center.

FIG. 19 illustrates an example of a rack 1902 that may be representative of a rack implemented according to rack architecture 1800 of FIG. 18 according to some embodiments. In the particular non-limiting example depicted in FIG. 19, rack 1902 features seven sled spaces 1903-1 to 1903-7, which include respective primary regions 1903-1A to 1903-7A and respective expansion regions 1903-1B to 1903-7B. In various embodiments, temperature control in rack 1902 may be implemented using an air cooling system. For example, as reflected in FIG. 19, rack 1902 may feature a plurality of fans 1919 that are generally arranged to provide air cooling within the various sled spaces 1903-1 to 1903-7. In some embodiments, the height of the sled space is greater than the conventional "1U" server height. In such embodiments, fans 1919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 1916-1 to 1916-7 may be configured to provide inserted sleds with access to power sourced by respective power modules 1920-1 to 1920-7, each of which may draw power from an external power source 1921. In various embodiments, external power source 1921 may deliver alternating current (AC) power to rack 1902, and power modules 1920-1 to 1920-7 may be configured to convert such AC power to direct current (DC) power to be sourced to inserted sleds. In some embodiments, for example, power modules 1920-1 to 1920-7 may be configured to convert 277-volt AC power into 12-volt DC power for provision to inserted sleds via respective MPCMs 1916-1 to 1916-7. The embodiments are not limited to this example.

MPCMs 1916-1 to 1916-7 may also be arranged to provide inserted sleds with optical signaling connectivity to a dual-mode optical switching infrastructure 1914, which may be the same as—or similar to—dual-mode optical switching infrastructure 1514 of FIG. 15. In various embodiments, optical connectors contained in MPCMs 1916-1 to 1916-7 may be designed to couple with counterpart optical connectors contained in MPCMs of inserted sleds to provide such sleds with optical signaling connectivity to dual-mode optical switching infrastructure 1914 via respective lengths of optical cabling 1922-1 to 1922-7. In some embodiments, each such length of optical cabling may extend from its corresponding MPCM to an optical interconnect loom 1923 that is external to the sled spaces of rack 1902. In various embodiments, optical interconnect loom 1923 may be arranged to pass through a support post or other type of load-bearing element of rack 1902. The embodiments are not limited in this context. Because inserted sleds connect to an optical switching infrastructure via MPCMs, the resources typically spent in manually configuring the rack cabling to accommodate a newly inserted sled can be saved.

Figure 20:
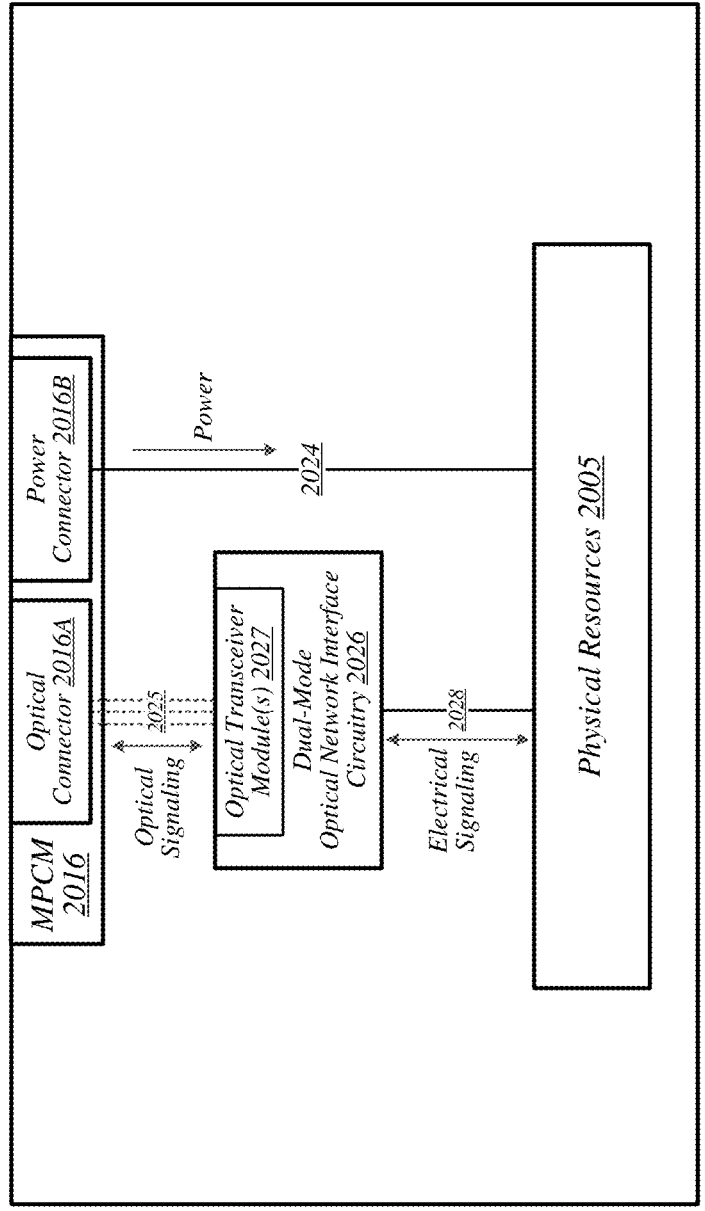
FIG. 20 illustrates an example of a sled.

FIG. 20 illustrates an example of a sled 2004 that may be representative of a sled designed for use in conjunction with rack 1902 of FIG. 19 according to some embodiments. Sled 2004 may feature an MPCM 2016 that comprises an optical connector 2016A and a power connector 2016B, and that is designed to couple with a counterpart MPCM of a sled space in conjunction with insertion of MPCM 2016 into that sled space. Coupling MPCM 2016 with such a counterpart MPCM may cause power connector 2016 to couple with a power connector comprised in the counterpart MPCM. This may generally enable physical resources 2005 of sled 2004 to source power from an external source, via power connector 2016 and power transmission media 2024 that conductively couples power connector 2016 to physical resources 2005.

Sled 2004 may also include dual-mode optical network interface circuitry 2026. Dual-mode optical network interface circuitry 2026 may generally comprise circuitry that is capable of communicating over optical signaling media according to each of multiple link-layer protocols supported by dual-mode optical switching infrastructure 1914 of FIG. 19. In some embodiments, dual-mode optical network interface circuitry 2026 may be capable both of Ethernet protocol communications and of communications according to a second, high-performance protocol. In various embodiments, dual-mode optical network interface circuitry 2026 may include one or more optical transceiver modules 2027, each of which may be capable of transmitting and receiving optical signals over each of one or more optical channels. The embodiments are not limited in this context.

Coupling MPCM 2016 with a counterpart MPCM of a sled space in a given rack may cause optical connector 2016A to couple with an optical connector comprised in the counterpart MPCM. This may generally establish optical connectivity between optical cabling of the sled and dual-mode optical network interface circuitry 2026, via each of a set of optical channels 2025. Dual-mode optical network interface circuitry 2026 may communicate with the physical resources 2005 of sled 2004 via electrical signaling media 2028. In addition to the dimensions of the sleds and arrangement of components on the sleds to provide improved cooling and enable operation at a relatively higher thermal envelope (e.g., 250 W), as described above with reference to FIG. 19, in some embodiments, a sled may include one or more additional features to facilitate air cooling, such as a heatpipe and/or heat sinks arranged to dissipate heat generated by physical resources 2005. It is worthy of note that although the example sled 2004 depicted in FIG. 20 does not feature an expansion connector, any given sled that features the design elements of sled 2004 may also feature an expansion connector according to some embodiments. The embodiments are not limited in this context.

Figure 21:
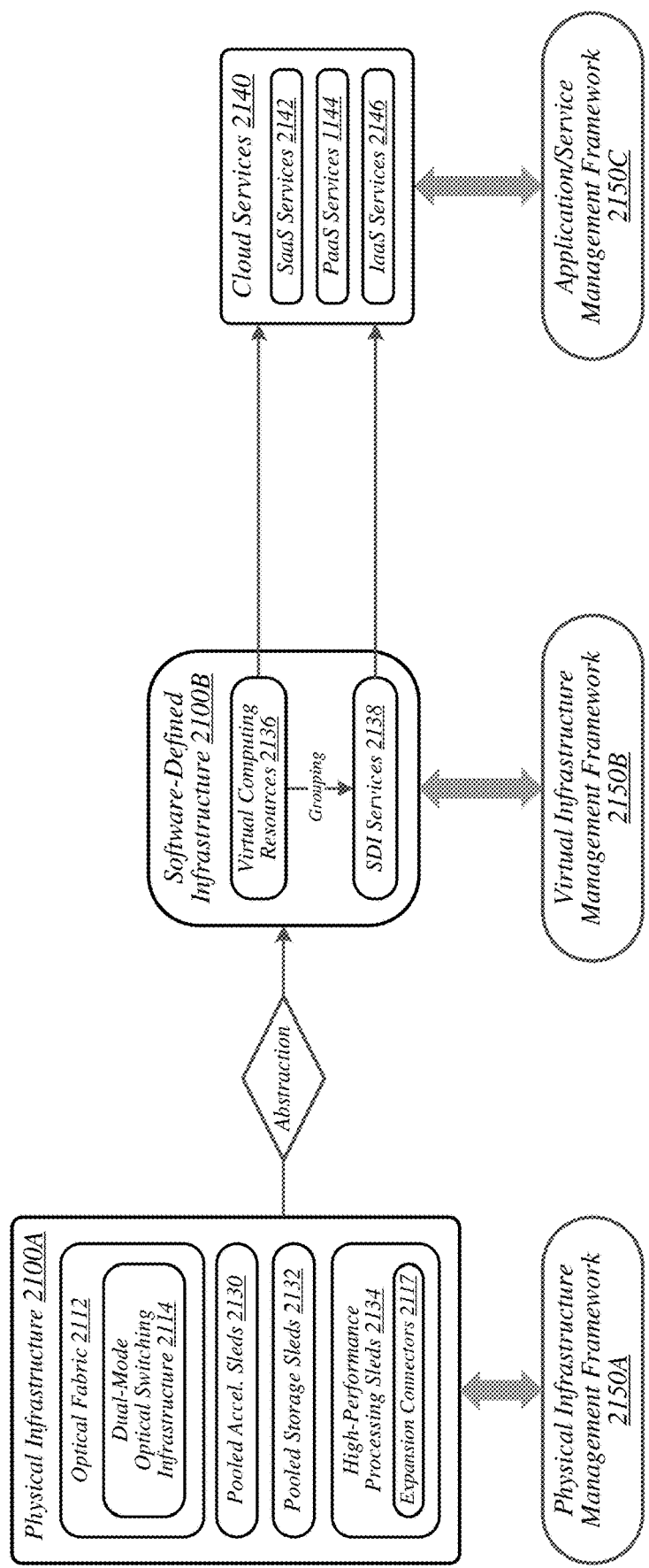
FIG. 21 illustrates an example of a data center.

FIG. 21 illustrates an example of a data center 2100 that may generally be representative of one in/for which one or more techniques described herein may be implemented according to various embodiments. As reflected in FIG. 21, a physical infrastructure management framework 2150A may be implemented to facilitate management of a physical infrastructure 2100A of data center 2100. In various embodiments, one function of physical infrastructure management framework 2150A may be to manage automated maintenance functions within data center 2100, such as the use of robotic maintenance equipment to service computing equipment within physical infrastructure 2100A. In some embodiments, physical infrastructure 2100A may feature an advanced telemetry system that performs telemetry reporting that is sufficiently robust to support remote automated management of physical infrastructure 2100A. In various embodiments, telemetry information provided by such an advanced telemetry system may support features such as failure prediction/prevention capabilities and capacity planning capabilities. In some embodiments, physical infrastructure management framework 2150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 21, the physical infrastructure 2100A of data center 2100 may comprise an optical fabric 2112, which may include a dual-mode optical switching infrastructure 2114. Optical fabric 2112 and dual-mode optical switching infrastructure 2114 may be the same as—or similar to—optical fabric 1412 of FIG. 14 and dual-mode optical switching infrastructure 1514 of FIG. 15, respectively, and may provide high-bandwidth, low-latency, multi-protocol connectivity among sleds of data center 2100. As discussed above, with reference to FIG. 11, in various embodiments, the availability of such connectivity may make it feasible to disaggregate and dynamically pool resources such as accelerators, memory, and storage. In some embodiments, for example, one or more pooled accelerator sleds 2130 may be included among the physical infrastructure 2100A of data center 2100, each of which may comprise a pool of accelerator resources—such as co-processors and/or FPGAs, for example—that is available globally accessible to other sleds via optical fabric 2112 and dual-mode optical switching infrastructure 2114.

In another example, in various embodiments, one or more pooled storage sleds 2132 may be included among the physical infrastructure 2100A of data center 2100, each of which may comprise a pool of storage resources that is available globally accessible to other sleds via optical fabric 2112 and dual-mode optical switching infrastructure 2114. In some embodiments, such pooled storage sleds 2132 may comprise pools of solid-state storage devices such as solid-state drives (SSDs). In various embodiments, one or more high-performance processing sleds 2134 may be included among the physical infrastructure 2100A of data center 2100. In some embodiments, high-performance processing sleds 2134 may comprise pools of high-performance processors, as well as cooling features that enhance air cooling to yield a higher thermal envelope of up to 250 W or more. In various embodiments, any given high-performance processing sled 2134 may feature an expansion connector 2117 that can accept a far memory expansion sled, such that the far memory that is locally available to that high-performance processing sled 2134 is disaggregated from the processors and near memory comprised on that sled. In some embodiments, such a high-performance processing sled 2134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 15. The embodiments are not limited in this context.

In various embodiments, one or more layers of abstraction may be applied to the physical resources of physical infrastructure 2100A in order to define a virtual infrastructure, such as a software-defined infrastructure 2100B. In some embodiments, virtual computing resources 2136 of software-defined infrastructure 2100B may be allocated to support the provision of cloud services 2140. In various embodiments, particular sets of virtual computing resources 1136 may be grouped for provision to cloud services 2140 in the form of SDI services 2138. Examples of cloud services 2140 may include—without limitation—software as a service (SaaS) services 2142, platform as a service (PaaS) services 2144, and infrastructure as a service (IaaS) services 2146.

In some embodiments, management of software-defined infrastructure 2100B may be conducted using a virtual infrastructure management framework 2150B. In various embodiments, virtual infrastructure management framework 2150B may be designed to implement workload fingerprinting techniques and/or machine-learning techniques in conjunction with managing allocation of virtual computing resources 2136 and/or SDI services 2138 to cloud services 2140. In some embodiments, virtual infrastructure management framework 2150B may use/consult telemetry data in conjunction with performing such resource allocation. In various embodiments, an application/service management framework 2150C may be implemented in order to provide QoS management capabilities for cloud services 2140. The embodiments are not limited in this context.

More generally, the various elements of the devices described herein may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the disclosure.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The disclosure now turns to providing various examples implementations.

Example 1

A software-defined infrastructure system, comprising: a compute node, including one or more processor circuits, configured to access one or more remote resources via a fabric, the compute node configured to: receive a dynamic tolerated fragmentation for the one or more remote resources; monitor performance of the one or more remote resources; determine that the monitored performance of the one or more remote resources is outside a threshold defined by the dynamic tolerated fragmentation; and generate a message indicating that performance of the one or more remote resources is outside the threshold defined by the dynamic tolerated fragmentation.

Example 2

The software-defined infrastructure system of Example 1, wherein the dynamic tolerated fragmentation includes a range of dynamic distance.

Example 3

The software-defined infrastructure system of Example 2, wherein the range of dynamic distance represents a range of latency.

Example 4

The software-defined infrastructure system of Example 2, wherein the range of dynamic distance represents a range of bandwidth.

Example 5

The software-defined infrastructure system of Example 2, wherein the dynamic tolerated fragmentation includes a standard deviation.

Example 6

The software-defined infrastructure system of Example 1, wherein the compute node includes a fragmentation optimizer configured to monitor the performance of the one or more remote resources.

Example 7

The software-defined infrastructure system of Example 6, wherein the fragmentation optimizer is configured to generate the message when performance of the one or more remote resources is outside a threshold defined by the dynamic tolerated fragmentation for more than a predetermined period of time.

Example 8

The software-defined infrastructure system of Example 1, wherein the message is generated to include a request for remapping the one or more remote resources.

Example 9

The software-defined infrastructure system of Example 1, wherein the message is generated to include a request for extending the one or more remote resources.

Example 10

The software-defined infrastructure system of Example 1, wherein the compute node is configured to: receive an indication that performance of the one or more remote resources cannot be changed to be within the threshold defined by the dynamic tolerated fragmentation; and generate a message to a software stack indicating that performance of the one or more remote resources cannot be changed to be within the threshold defined by the dynamic tolerated fragmentation.

Example 11

A computer-implemented method, comprising: receiving, at a compute node of a software-defined infrastructure system, a dynamic tolerated fragmentation for one or more remote resources; monitoring, by the compute node, performance of the one or more remote resources; determining, by the compute node, that the monitored performance of the one or more remote resources is outside a threshold defined by the dynamic tolerated fragmentation; and generating, by the compute node, a message indicating that performance of the one or more remote resources is outside the threshold defined by the dynamic tolerated fragmentation.

Example 12

The computer-implemented method of Example 11, wherein the dynamic tolerated fragmentation includes a range of dynamic distance.

Example 13

The computer-implemented method of Example 12, wherein the range of dynamic distance represents a range of latency.

Example 14

The computer-implemented method of Example 12, wherein the range of dynamic distance represents a range of bandwidth.

Example 15

The computer-implemented method of Example 12, wherein the dynamic tolerated fragmentation includes a standard deviation.

Example 16

The computer-implemented method of Example 11, wherein the compute node includes a fragmentation optimizer configured to monitor the performance of the one or more remote resources.

Example 17

The computer-implemented method of Example 16, wherein the fragmentation optimizer is configured to generate the message when performance of the one or more remote resources is outside a threshold defined by the dynamic tolerated fragmentation for more than a predetermined period of time.

Example 18

The computer-implemented method of Example 11, wherein the message is generated to include a request for remapping the one or more remote resources.

Example 19

The computer-implemented method of Example 11, wherein the message is generated to include a request for extending the one or more remote resources.

Example 20

The computer-implemented method of Example 11, wherein the compute node is configured to: receive an indication that performance of the one or more remote resources cannot be changed to be within the threshold defined by the dynamic tolerated fragmentation; and generate a message to a software stack indicating that performance of the one or more remote resources cannot be changed to be within the threshold defined by the dynamic tolerated fragmentation.

Example 21

An article comprising a non-transitory computer-readable storage medium that stores instructions for execution by processing circuitry of a compute node of a software-defined infrastructure system, the instructions to cause the compute node to: receive, by the compute node, a dynamic tolerated fragmentation for one or more remote resources; monitor, by the compute node, performance of the one or more remote resources; determine, by the compute node, that the monitored performance of the one or more remote resources is outside a threshold defined by the dynamic tolerated fragmentation; and generate, by the compute node, a message indicating that performance of the one or more remote resources is outside the threshold defined by the dynamic tolerated fragmentation.

Example 22

The article of Example 21, wherein the dynamic tolerated fragmentation includes a range of dynamic distance.

Example 23

The article of Example 22, wherein the range of dynamic distance represents a range of latency.

Example 24

The article of Example 22, wherein the range of dynamic distance represents a range of bandwidth.

Example 25

The article of Example 22, wherein the dynamic tolerated fragmentation includes a standard deviation.

Example 26

The article of Example 21, wherein the compute node includes a fragmentation optimizer configured to monitor the performance of the one or more remote resources.

Example 27

The article of Example 26, wherein the fragmentation optimizer is configured to generate the message when performance of the one or more remote resources is outside a threshold defined by the dynamic tolerated fragmentation for more than a predetermined period of time.

Example 28

The article of Example 21, wherein the message is generated to include a request for remapping the one or more remote resources.

Example 29

The article of Example 21, wherein the message is generated to include a request for extending the one or more remote resources.

Example 30

The article of Example 21, further comprising instructions for execution by the processing circuitry of the compute node of the software-defined infrastructure system, the instructions to cause the compute node to: receive an indication that performance of the one or more remote resources cannot be changed to be within the threshold defined by the dynamic tolerated fragmentation; and generate a message to a software stack indicating that performance of the one or more remote resources cannot be changed to be within the threshold defined by the dynamic tolerated fragmentation.

Example 31

A compute node of a software-defined infrastructure system, comprising: means for receiving a dynamic tolerated fragmentation for one or more remote resources; means for monitoring performance of the one or more remote resources; means for determining that the monitored performance of the one or more remote resources is outside a threshold defined by the dynamic tolerated fragmentation; and means for generating a message indicating that performance of the one or more remote resources is outside the threshold defined by the dynamic tolerated fragmentation.

Example 32

The compute node of Example 31, wherein the dynamic tolerated fragmentation includes a range of dynamic distance.

Example 33

The compute node of Example 32, wherein the range of dynamic distance represents a range of latency.

Example 34

The compute node of Example 32, wherein the range of dynamic distance represents a range of bandwidth.

Example 35

The compute node of Example 32, wherein the dynamic tolerated fragmentation includes a standard deviation.

Example 36

The compute node of Example 31, wherein the compute node includes a fragmentation optimizer configured to monitor the performance of the one or more remote resources.

Example 37

The compute node of Example 36, wherein the fragmentation optimizer is configured to generate the message when performance of the one or more remote resources is outside a threshold defined by the dynamic tolerated fragmentation for more than a predetermined period of time.

Example 38

The compute node of Example 31, wherein the message is generated to include a request for remapping the one or more remote resources.

Example 39

The compute node of Example 31, wherein the message is generated to include a request for extending the one or more remote resources.

Example 40

The compute node of Example 31, further comprising: means for receiving an indication that performance of the one or more remote resources cannot be changed to be within the threshold defined by the dynamic tolerated fragmentation; and means for generating a message to a software stack indicating that performance of the one or more remote resources cannot be changed to be within the threshold defined by the dynamic tolerated fragmentation.

Example 41

An apparatus, comprising: at least one memory; at least one processor; and logic, at least a portion of the logic comprised in hardware and executed by the at least one processor, the logic to: receive a dynamic tolerated fragmentation for one or more remote resources; monitor performance of the one or more remote resources; determine that the monitored performance of the one or more remote resources is outside a threshold defined by the dynamic tolerated fragmentation; and generate a message indicating that performance of the one or more remote resources is outside the threshold defined by the dynamic tolerated fragmentation.

Example 42

The apparatus of Example 41, wherein the dynamic tolerated fragmentation includes a range of dynamic distance.

Example 43

The apparatus of Example 42, wherein the range of dynamic distance represents a range of latency.

Example 44

The apparatus of Example 42, wherein the range of dynamic distance represents a range of bandwidth.

Example 45

The apparatus of Example 42, wherein the dynamic tolerated fragmentation includes a standard deviation.

Example 46

The apparatus of Example 41, wherein the compute node includes a fragmentation optimizer configured to monitor the performance of the one or more remote resources.

Example 47

The apparatus of Example 46, wherein the fragmentation optimizer is configured to generate the message when performance of the one or more remote resources is outside a threshold defined by the dynamic tolerated fragmentation for more than a predetermined period of time.

Example 48

The apparatus of Example 41, wherein the message is generated to include a request for remapping the one or more remote resources.

Example 49

The apparatus of Example 41, wherein the message is generated to include a request for extending the one or more remote resources.

Example 50

The apparatus of Example 41, wherein the logic to: receive an indication that performance of the one or more remote resources cannot be changed to be within the threshold defined by the dynamic tolerated fragmentation; and generate a message to a software stack indicating that performance of the one or more remote resources cannot be changed to be within the threshold defined by the dynamic tolerated fragmentation.

The invention claimed is:

1. A software-defined infrastructure system, comprising:
a compute node, including one or more processor circuits, configured to access one or more remote resources via an optical fabric, a first portion of the remote resources provided by a first remote system and a second portion of the remote resources provided by a second remote system, the compute node configured to:
receive a dynamic tolerated fragmentation for the one or more remote resources, the dynamic tolerated fragmentation comprising a range of latency;
monitor performance of the one or more remote resources provided by the first and second remote systems;
determine that the monitored performance of the first portion of the one or more remote resources provided by the first remote system is outside a threshold defined by the dynamic tolerated fragmentation;
generate a message indicating that performance of the first portion of the one or more remote resources provided by the first remote system is outside the threshold defined by the dynamic tolerated fragmentation; and
remap the first portion of the one or more remote resources from the first remote system to a third remote system, wherein the first, second, and third remote systems comprise different physical systems.

2. The software-defined infrastructure system of claim 1, wherein the dynamic tolerated fragmentation further comprises a range of bandwidth.

3. The software-defined infrastructure system of claim 1, wherein the dynamic tolerated fragmentation is further based on a standard deviation of the monitored performance of the one or more resources provided by the first and second remote systems.

4. The software-defined infrastructure system of claim 1, wherein the compute node includes a fragmentation optimizer configured to monitor the performance of the one or more remote resources.

5. The software-defined infrastructure system of claim 4, wherein the fragmentation optimizer is configured to generate the message when performance of the one or more remote resources is outside the threshold defined by the dynamic tolerated fragmentation for more than a predetermined period of time.

6. The software-defined infrastructure system of claim 1, wherein the message is generated to include a request to remap the one or more remote resources.

7. The software-defined infrastructure system of claim 1, wherein the message is generated to include a request for extending the second portion of the one or more remote resources to include additional resources provided by the third remote system.

8. The software-defined infrastructure system of claim 1, wherein the compute node is configured to:
receive an indication specifying that a monitored performance of the first portion of the one or more remote resources provided by the third remote system cannot be changed to be within the threshold defined by the dynamic tolerated fragmentation; and
generate a message to a software stack indicating that the first portion of the one or more remote resources provided by the third remote system cannot be changed to be within the threshold defined by the dynamic tolerated fragmentation, the software stack to refrain from modifying the first portion of the one or more remote resources provided by the third remote system based on the message, the software stack comprising one or more of a fragmentation optimizer provided by the compute node, an application executing on the compute node, or an operating system executing on the compute node.

9. A computer-implemented method, comprising:
receiving, at a compute node of a software-defined infrastructure system, a dynamic tolerated fragmentation for one or more remote resources accessible via an optical fabric, a first portion of the remote resources provided by a first remote system and a second portion of the remote resources provided by a second remote system, the dynamic tolerated fragmentation comprising a range of bandwidth;
monitoring, by the compute node, performance of the one or more remote resources provided by the first and second remote systems;
determining, by the compute node, that the monitored performance of the first portion of the one or more remote resources provided by the first remote system is outside a threshold defined by the dynamic tolerated fragmentation;
generating, by the compute node, a message indicating that performance of the first portion of the one or more remote resources provided by the first remote system is outside the threshold defined by the dynamic tolerated fragmentation; and
remapping, by the compute node, the first portion of the one or more remote resources from the first remote system to a third remote system, wherein the first, second, and third remote systems comprise different physical systems.

10. The computer-implemented method of claim 9, wherein the dynamic tolerated fragmentation further comprises a range of latency.

11. The computer-implemented method of claim 9, wherein the dynamic tolerated fragmentation is further based on a standard deviation of the monitored performance of the one or more resources provided by the first and second remote systems.

12. The computer-implemented method of claim 9, wherein the compute node includes a fragmentation optimizer configured to monitor the performance of the one or more remote resources.

13. The computer-implemented method of claim 12, wherein the fragmentation optimizer is configured to generate the message when performance of the one or more remote resources is outside the threshold defined by the dynamic tolerated fragmentation for more than a predetermined period of time.

14. The computer-implemented method of claim 9, wherein the message is generated to include a request to remap the one or more remote resources.

15. The computer-implemented method of claim 9, wherein the message is generated to include a request for extending the second portion of the one or more remote resources to include additional resources provided by the third remote system.

16. The computer-implemented method of claim 9, wherein the compute node is configured to:
receive an indication specifying that a monitored performance of the first portion of the one or more remote resources provided by the third remote system cannot be changed to be within the threshold defined by the dynamic tolerated fragmentation; and
generate a message to a software stack indicating that the first portion of the one or more remote resources provided by the third remote system cannot be changed to be within the threshold defined by the dynamic tolerated fragmentation, the software stack to refrain from modifying the first portion of the one or more remote resources provided by the third remote system based on the message, the software stack comprising one or more of a fragmentation optimizer provided by the compute node, an application executing on the compute node, or an operating system executing on the compute node.

17. An article comprising a non-transitory computer-readable storage medium that stores instructions for execution by processing circuitry of a compute node of a software-defined infrastructure system, the instructions to cause the compute node to:
receive, by the compute node, a dynamic tolerated fragmentation for one or more remote resources, a first portion of the remote resources provided by a first remote system and a second portion of the remote resources provided by a second remote system, the dynamic tolerated fragmentation comprising a range of latency;
monitor, by the compute node, performance of the one or more remote resources provided by the first and second remote systems;
determine, by the compute node, that the monitored performance of the first portion of the one or more remote resources provided by the first remote system is outside a threshold defined by the dynamic tolerated fragmentation;
generate, by the compute node, a message indicating that performance of the first portion of the one or more remote resources provided by the first remote system is outside the threshold defined by the dynamic tolerated fragmentation; and
remap the first portion of the one or more remote resources from the first remote system to a third remote system, wherein the first, second, and third remote systems comprise different physical systems accessible via an optical fabric.

18. The article of claim 17, wherein the dynamic tolerated fragmentation further comprises a range of bandwidth.

19. The article of claim 17, wherein the dynamic tolerated fragmentation is further based on a standard deviation of the monitored performance of the one or more resources provided by the first and second remote systems.

* * * * *